(12) United States Patent
Sakurai et al.

(10) Patent No.: US 12,014,736 B2
(45) Date of Patent: Jun. 18, 2024

(54) INFORMATION PROCESSING APPARATUS AND INFORMATION PROCESSING METHOD

(71) Applicant: SONY GROUP CORPORATION, Tokyo (JP)

(72) Inventors: Tatsuma Sakurai, Tokyo (JP); Ichitaro Kohara, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 356 days.

(21) Appl. No.: 17/413,158

(22) PCT Filed: Oct. 30, 2019

(86) PCT No.: PCT/JP2019/042655
§ 371 (c)(1),
(2) Date: Jun. 11, 2021

(87) PCT Pub. No.: WO2020/129421
PCT Pub. Date: Jun. 25, 2020

(65) Prior Publication Data
US 2022/0051672 A1 Feb. 17, 2022

(30) Foreign Application Priority Data
Dec. 19, 2018 (JP) ................. 2018-237400

(51) Int. Cl.
*G10L 15/22* (2006.01)
*A63H 5/00* (2006.01)
(Continued)

(52) U.S. Cl.
CPC ................ *G10L 15/22* (2013.01); *A63H 5/00* (2013.01); *A63H 11/00* (2013.01); *G10L 15/28* (2013.01); *A63H 2200/00* (2013.01)

(58) Field of Classification Search
CPC .......... G10L 15/22; G10L 15/28; A63H 5/00; A63H 11/00; A63H 2200/00
See application file for complete search history.

(56) References Cited

U.S. PATENT DOCUMENTS

| 2008/0120106 A1 | 5/2008 | Izumida et al. |
| 2018/0204574 A1 | 7/2018 | Hart |
| 2019/0070735 A1* | 3/2019 | Tappeiner ............... G10L 17/00 |

FOREIGN PATENT DOCUMENTS

| JP | 2002-207497 A | 7/2002 |
| JP | 2003-305677 A | 10/2003 |

(Continued)

OTHER PUBLICATIONS

International Search Report and Written Opinion of PCT Application No. PCT/JP2019/042655, dated Dec. 10, 2019, 09 pages of ISRWO.

*Primary Examiner* — Fan S Tsang
*Assistant Examiner* — David Siegel
(74) *Attorney, Agent, or Firm* — CHIP LAW GROUP

(57) ABSTRACT

An information processing apparatus that includes a control unit controlling an action of an autonomous operation unit, and in which the control unit controls transition of plural states relating to speech recognition processing through the autonomous operation unit based on a detected trigger, and the states include a first active state in which an action of the autonomous operation unit is restricted, and a second active state in which the speech recognition processing is performed. An information processing method in which a processor controls an action of an autonomous operation unit, the controlling includes controlling transition of plural states relating to speech recognition processing through the autonomous operation unit based on a detected trigger, and the states include a first active state in which an action of the autonomous operation unit is restricted, and a second active (Continued)

state in which the speech recognition processing is performed.

18 Claims, 25 Drawing Sheets

(51) Int. Cl.
*A63H 11/00* (2006.01)
*G10L 15/28* (2013.01)

(56) References Cited

FOREIGN PATENT DOCUMENTS

| | | | |
|---|---|---|---|
| JP | 2003305677 A | * | 10/2003 |
| JP | 2006-187825 A | | 7/2006 |
| JP | 2008-129412 A | | 6/2008 |
| JP | 2008-170806 A | | 7/2008 |
| JP | 2014-191029 A | | 10/2014 |
| JP | 2017-138476 A | | 8/2017 |

* cited by examiner

FIG.2

| ENVIRONMENTAL TRIGGER | DETECTION OF TOUCH (LIFTING OR THE LIKE) TO AUTONOMOUS OPERATION UNIT, INCREASE OF ILLUMINATION, MOVING OBJECT, SUDDEN SOUND |
|---|---|
| END ENVIRONMENTAL TRIGGER | DETECTION OF END OF TOUCH TO AUTONOMOUS OPERATION UNIT, DECREASE OF ILLUMINATION, DECREASE OF ENVIRONMENTAL NOISE |
| PREFIX TRIGGER | DETECTION OF SPECIFIC WORD, SPECIFIC GESTURE, TOUCH TO AUTONOMOUS OPERATION UNIT, SUDDEN SOUND, FACE, MOVING BODY |
| POSTFIX TRIGGER | DETECTION OF SPECIFIC WORD, SPECIFIC GESTURE, TOUCH TO AUTONOMOUS OPERATION UNIT, SUDDEN SOUND, FACE, MOVING BODY |
| CONVERSATION END TRIGGER | DETECTION OF SPECIFIC WORD, SPECIFIC GESTURE, TOUCH TO AUTONOMOUS OPERATION UNIT, SUDDEN SOUND, FACE |

FIG.3

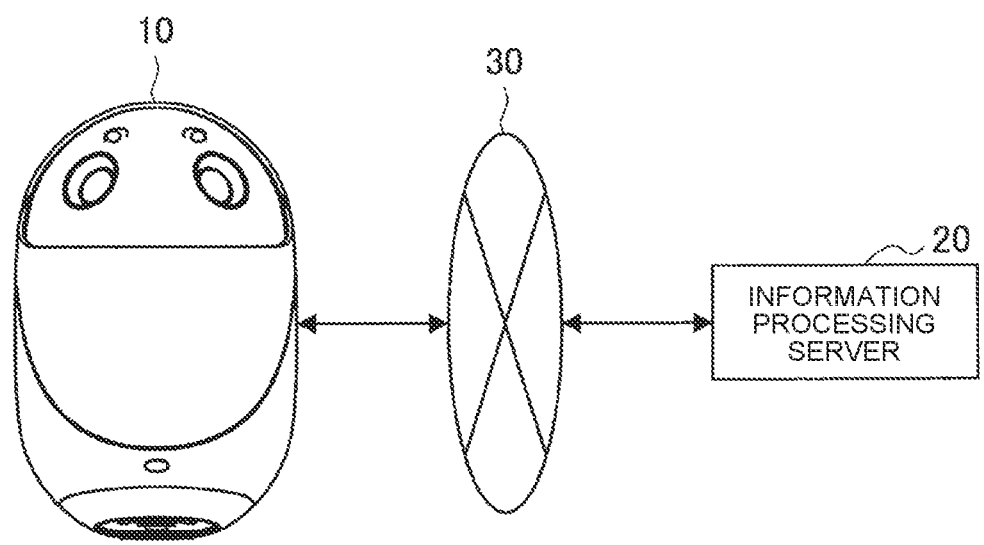

FIG.12
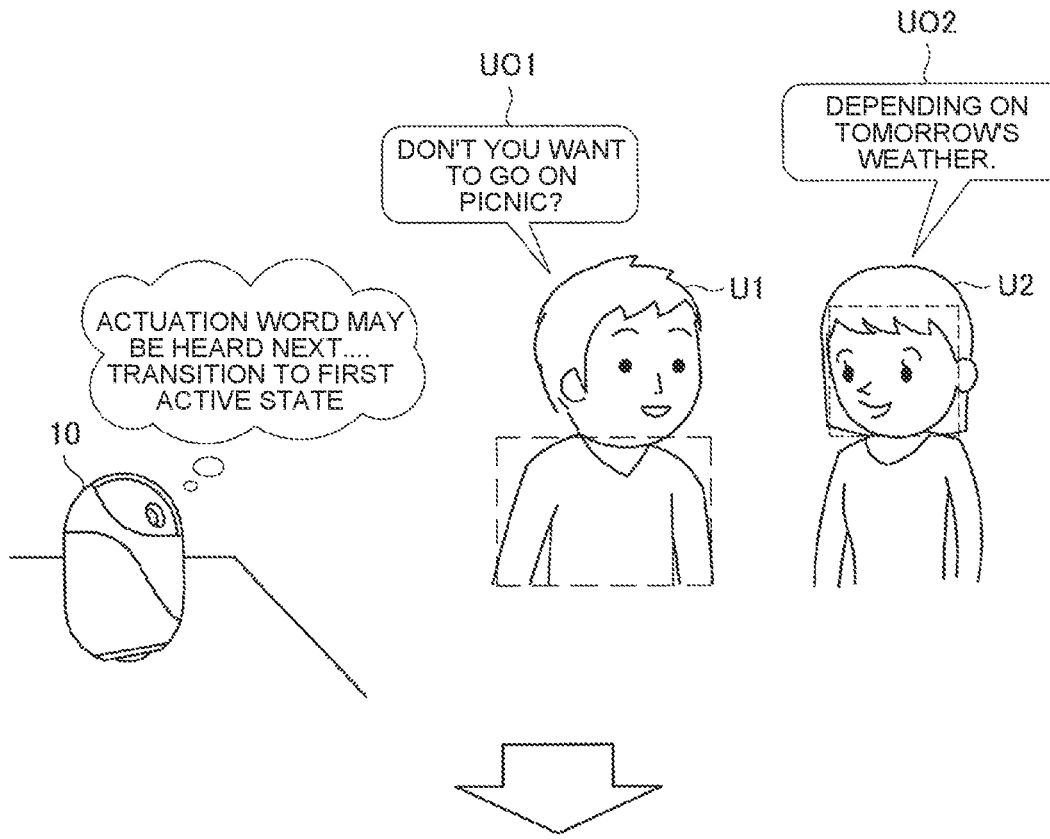
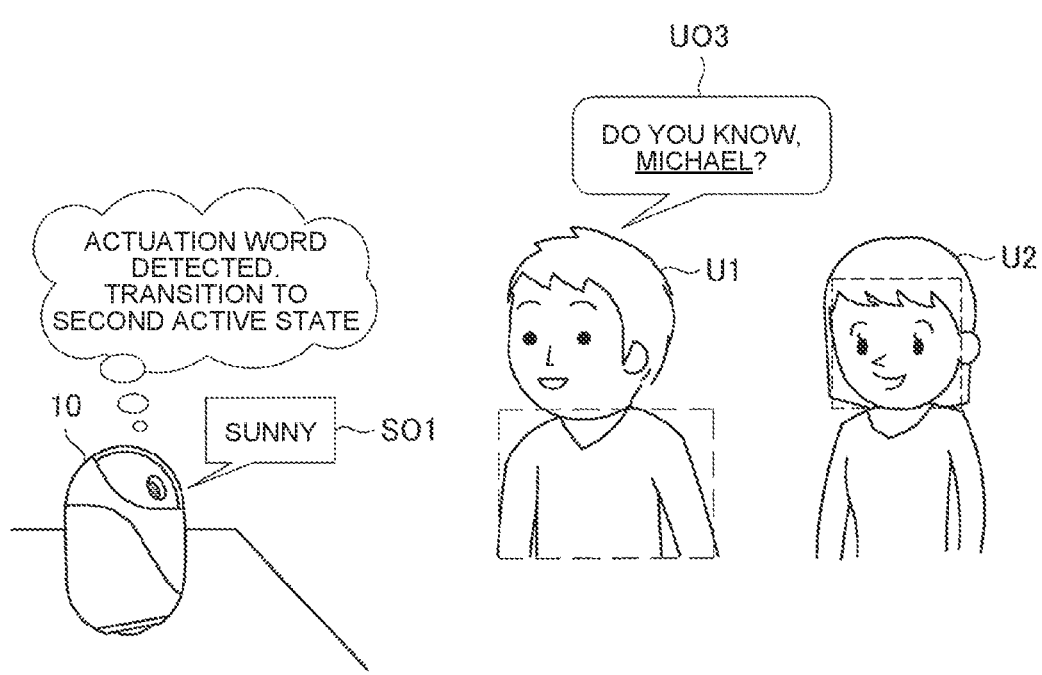

FIG.16
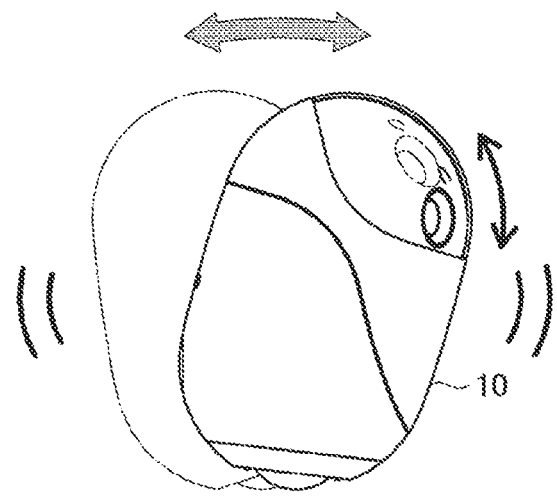
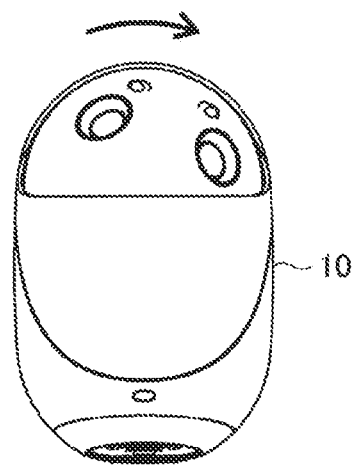
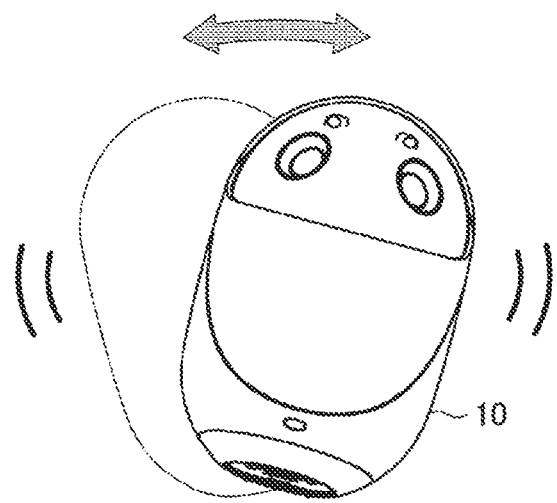

INFORMATION PROCESSING APPARATUS AND INFORMATION PROCESSING METHOD

CROSS REFERENCE TO RELATED APPLICATIONS

This application is a U.S. National Phase of International Patent Application No. PCT/JP2019/042655 filed Oct. 30, 2019, which claims priority benefit of Japanese Patent Application No. JP 2018-237400 filed in the Japan Patent Office on Dec. 19, 2018. Each of the above-referenced applications is hereby incorporated herein by reference in its entirety.

FIELD

The present disclosure relates to an information processing apparatus, an information processing method, and a program.

BACKGROUND

In recent years, various kinds of apparatuses that perform actions based on speech recognition processing have widely been used. Moreover, many of techniques to improve the accuracy of the speech recognition processing have also been developed. For example, Patent Literature 1 discloses a technique to improve the speech recognition accuracy by reducing volume level of other devices that can be a sound source of noises.

CITATION LIST

Patent Literature

Patent Literature 1: JP 2017-138476 A

SUMMARY

Technical Problem

However, it is also assumed that the apparatus that collects a spoken voice of a user itself makes autonomous actions or the like. In this case, the operating noise of the apparatus itself can be a cause of reduction in the speech recognition accuracy.

Solution to Problem

According to the present disclosure, an information processing apparatus is provided that includes: a control unit that controls an action of an autonomous operation unit, wherein the control unit controls transition of a plurality of states relating to speech recognition processing through the autonomous operation unit based on a detected trigger, and the states include a first active state in which an action of the autonomous operation unit is restricted, and a second active state in which the speech recognition processing is performed.

Moreover, according to the present disclosure, an information processing method is provided that includes: controlling an action of an autonomous operation unit, wherein the controlling includes controlling transition of a plurality of states relating to speech recognition processing through the autonomous operation unit based on a detected trigger, and the states include a first active state in which an action of the autonomous operation unit is restricted, and a second active state in which the speech recognition processing is performed.

Moreover, according to the present disclosure, a program is provided that causes a computer to function as an information processing apparatus including: a control unit that controls an action of an autonomous operation unit, wherein the control unit controls transition of a plurality of states relating to speech recognition processing through the autonomous operation unit based on a detected trigger, and the states include a first active state in which an action of the autonomous operation unit is restricted, and a second active state in which the speech recognition processing is performed.

BRIEF DESCRIPTION OF DRAWINGS

FIG. 2 is a diagram illustrating a specific example of a trigger according to the embodiment.

FIG. 3 is a diagram illustrating a configuration example of an information processing system according to the embodiment.

FIG. 12 is a diagram for explaining about a postfix trigger corresponding to a conversation among users according to the embodiment.

FIG. 16 is a diagram illustrating an example of expression of a state by movement of an eye part or a device body according to the embodiment.

DESCRIPTION OF EMBODIMENTS

Figure 1:
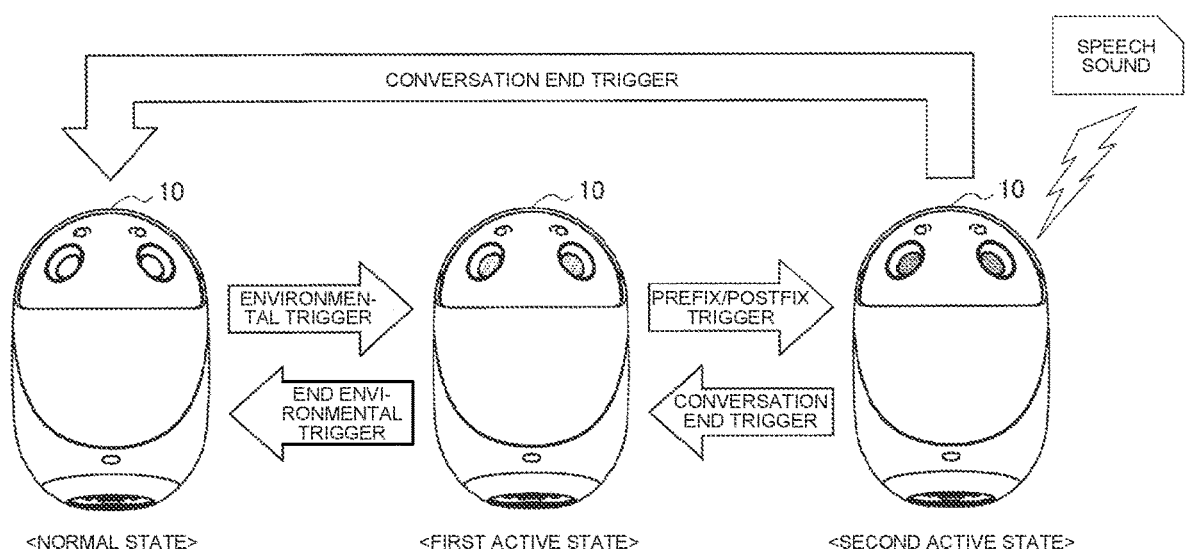
FIG. 1 is a diagram for explaining an overview of one embodiment of the present disclosure.

Hereinafter, exemplary embodiments of the present disclosure will be explained in detail with reference to the accompanying drawings. In the present specification and drawings, identical reference signs are assigned to components having substantially the same functional configurations, and duplicated explanation will be thereby omitted.

Explanation will be given in following order.
1. Embodiment
   1.1. Overview
   1.2. System Configuration Example
   1.3 Functional Configuration Example of Autonomous operation unit 10
   1.4. Functional Configuration of Information Processing Server 20
   1.5. Details of Functions
   1.6. Hardware Configuration Example
2. Conclusion

1. EMBODIMENT

1.1. Overview

First, an overview of one embodiment of the present disclosure will be explained. As described above, in recent years, various kinds of apparatuses that perform actions based on speech recognition processing have widely been used. The apparatus as described above generally sends collected a speech sound of a user to a server device through a network, and receives a result of speech recognition processing by the server device, to implement various actions.

In this case, the transmission of speech sound to the server device is needed to take account of privacy and communication volume.

For example, it is assumed that a speech of a user includes what is not intended for inquiry to a system a lot. Therefore, the apparatus that collects a speech sound is preferable to transmit only a speech sound of the user intended for inquiry to the system to the server device, and to notify of execution of the transmission of the speech sound.

Moreover, the transmission of a speech sound requires communication fee, and the speech recognition processing by the server device also requires calculation cost. Accordingly, the apparatus that collects a speech sound is preferable to transmit only minimum needed speech sound to the server device, to suppress communication fee and calculation cost.

From the above viewpoint, most apparatuses adopt a method in which a fixed wake up word (WUW) is set, and a speech sound of a user is transmitted to the server only during a predetermined active period after a recognition of the wake up word spoken, and communication is shut after the active period is over.

However, in the control using a wake up word as described above, a user has to speak the wake up word each time of inquiry to a system, and has to speak an intended speech each time after confirming that the wake up word has been recognized, visually with lighting of a light source or the like. Accordingly, the operation becomes complicated, and it is difficult to make a natural conversation.

Furthermore, in recent years, there is a case in which an autonomous operation unit that autonomously makes an action based on an estimated environment collects a speech sound for speech recognition processing. In this case, the operating noise generated with the action of the autonomous operation unit can reduce the accuracy of collecting the speech sound and, as a consequence, can be a cause of reduction of the speech recognition accuracy.

The technical idea according to one embodiment of the present disclosure is thought of by focusing on the points as described above, and it enables to improve the accuracy of speech recognition processing performed through an autonomous operation unit, and to make a natural conversation.

When the control using only a wake up word is performed in the collection of a speech sound of a user by an autonomous operation unit, and in the speech recognition processing based on a relevant speech sound, for example, there are following problems.
1. The accuracy of wake up word recognition is reduced in an environment with an operating noise and undesired sound.
2. It is necessary to speak a wake up word each time, making it complicated.
3. It takes time until completion of speech of a wake up word, and until completion of recognition of the wake up word.
4. Because it is necessary to speak a wake up word each time, a natural conversation is difficult to be made.
5. A fixed wake up word can be difficult to be spoken depending on a user.
6. When an expressing method relating to transmission of a speech sound is only simple lighting of a light source, it is less-expressive.

In one embodiment of the present disclosure, transition among plural states of an autonomous operation unit relating to speech recognition processing based on respective kinds of triggers is controlled, and the autonomous operation unit is caused to make different expressions for respective states, thereby solving the points described above.

FIG. 1 is a diagram for explaining an overview of the present embodiment. In FIG. 1, transition of states of an autonomous operation unit 10 according to the present embodiment is illustrated. FIG. 1 illustrates a case in which the autonomous operation unit 10 is a robot having a long elliptic body that moves autonomously based on a result of various kind of recognition processing. The autonomous operation unit 10 according to the present embodiment may be, for example, a compact robotic device in a size and weight that a user can lift up easily with one hand.

In this case, a control unit 150 of the autonomous operation unit 10 according to the present embodiment controls transition of states according to speech recognition processing of the autonomous operation unit 10 based on various kinds of detected triggers. The states include, for example, a normal state, a first active state, and a second active state.

The normal state according to the present embodiment may be a state not restricting autonomous actions by the autonomous operation unit 10. Moreover, the first active state according to the present embodiment may be a state restricting some of the autonomous actions by the autonomous operation unit 10. Furthermore, the second active state may be a state in which a speech sound of a user is transmitted to an information processing server 20 that performs the speech recognition processing, that is, a state corresponding to the active period described above. In the second active state according to the present embodiment, sound streaming may be performed all the time to the server device regardless of whether the respective kinds of triggers as described above are detected, and the speech recognition processing may be performed all the time. By such a control, more natural conversation can be made, unlike the case in which some kind of trigger is necessary to start the speech recognition processing each time.

The control unit 150 according to the present embodiment causes the autonomous operation unit 10 to transition to the first active state, for example, when an environmental trigger indicating that the possibility that a user makes a speech with respect to the autonomous operation unit 10 has increased is detected in the normal state. That is, the control unit 150 according to the present embodiment causes the autonomous operation unit 10 to transition to the first active state that restricts the autonomous actions of the autonomous operation unit 10 to be prepared for an inquiry from the user when it is detected that the possibility that the user speaks to the autonomous operation unit 10 has increased.

The environmental trigger according to the present embodiment includes touch to the autonomous operation unit 10, particularly detection of lifting, detection of increase in illumination by lighting of an illumination and the like, detection of a moving object, such as the face or body of the user, detection of sudden sound different from regular sound, or the like. FIG. 2 illustrates a specific example of the trigger according to the present embodiment.

When the environmental trigger as described above is detected, the possibility that the user speaks to the autonomous operation unit 10 is high and, therefore, the autonomous operation unit 10 transitions to the first active state, to reduce the operating noise of itself by stopping autonomous actions or the like, and can thereby collect a speech sound of the user effectively. As described, the control unit 150 according to the present embodiment may control such that the volume of the operating noise of the autonomous operation unit 10 becomes lower than a threshold in the first active state.

Moreover, as illustrated in FIG. 1, when an end environmental trigger indicating that the possibility that the user speaks to the autonomous operation unit 10 has become low is detected in the first active state, the control unit 150 according to the present embodiment causes the autonomous operation unit 10 to transition to the normal state.

The end environmental trigger according to the present embodiment includes detection of end of touch to the autonomous operation unit, particularly, still standing of the autonomous operation unit 10, detection of reduction in illumination by turning off of the illumination or the like, detection of reduction of environmental noise, and the like.

That is, the autonomous operation unit 10 according to the present embodiment may return to the normal state when it is estimated that the possibility of occurrence of an inquiry from the user is low for a while as the user has left the place, the autonomous operation unit 10 held in the hand has put on a floor, or the like.

On the other hand, the control unit 150 according to the present embodiment causes the autonomous operation unit 10 to transition to the second active state when a prefix trigger or a postfix trigger is detected in the first active state. The prefix trigger and the postfix trigger according to the present embodiment are words and actions of the user indicating an intension of making a pre- or posterior inquiry to the system, and can be detected before or after a speech corresponding to an inquiry, respectively.

The prefix and the postfix triggers according to the present embodiment include, for example, as illustrated in FIG. 2, detection of a specific word (that is, wake up word), detection of a specific gesture, detection of touch to the autonomous operation unit 10, detection of the face of a user or the like, detection of sudden sound, detection of a moving body, and the like. A sensor unit 130 can detect a moving body, for example, based on a temperature change detected by an infrared sensor, a reaction of a human detecting sensor, and the like.

As described, the autonomous operation unit 10 according to the present embodiment causes the autonomous operation unit 10 to transition to the second active state based on various triggers other than the wake up word, and can cause the autonomous operation unit 10 to transmit a speech sound of a user collected by the autonomous operation unit 10 to the information processing sensor 20.

Moreover, the control unit 150 according to the present embodiment causes the autonomous operation unit 10 to transition to the first active state or the normal state when a conversation end trigger corresponding to an end of conversation is detected in the second active state.

The conversation end trigger according to the present embodiment includes, for example, as illustrated in FIG. 2, detection of a specific word, detection of a specific gesture, detection of touch to the autonomous operation unit 10, detection of the face of a user and the like, detection of a sudden sound, and the like.

As described, the autonomous operation unit 10 according to the present embodiment can estimate an end of inquiry by a user by detecting various triggers, and can prevent a speech sound from being unnecessarily transmitted thereafter to the information processing server 20.

As above, the overview of the state transition of the autonomous operation unit 10 according to the present embodiment has been described. According to the control for the state transition described above, the problems 1 to 5 above can be solved, and the speech recognition accuracy can be improved and more natural conversation is enabled to be made.

Moreover, for example, as illustrated in FIG. 1, the control unit 150 according to the present embodiment changes the color of eyes depending on a state, or controls to make a different action using a face and a body depending on a state. Thus, the control unit 150 controls the autonomous operation unit 10 to make different expressions respectively in the normal state, the first active state, and the second active state, and thereby solves the problem 6 described above, and it is possible to notify the user that a speech sound is being transmitted explicitly.

Hereinafter, a configuration to implement the functions described above and an effect produced by the configuration will be explained in more detail.

1.2. System Configuration Example

First, a system configuration example of an information processing system according to the present embodiment will be explained. FIG. 3 is a diagram illustrating a configuration example of the information processing system according to the embodiment. As illustrated in FIG. 3, the information processing system according to the present embodiment includes the autonomous operation unit 10 and the information processing server 20. Moreover, the autonomous operation unit 10 and the information processing server 20 are connected to each other through a network 30 such that mutual communication is possible.

Autonomous Operation Unit 10

The autonomous operation unit 10 according to the present embodiment is an information processing apparatus, a state of which transitions among plural states relating to speech recognition processing, based on a detected trigger. As described above, the autonomous operation unit 10 according to the present embodiment may be a robotic device that makes autonomous movement based on a recognized environment. Note that a shape of the autonomous operation unit 10 according to the present embodiment is not limited to an oval shape as illustrated, but it may be various kinds of robotic devices modeled after an animal, a human, or the like.

Information Processing Server 20

The information processing server 20 according to the present embodiment is an information processing apparatus that performs speech recognition processing based on a speech sound received from the autonomous operation unit 10. Moreover, the information processing server 20 according to the present embodiment may be configured to perform natural language processing with respect to a speech recognition result, and to perform generation of a response to an intention of a speech of a user.

Network 30

The network 30 has a function of connecting the autonomous operation unit 10 and the information processing server 20. The network 30 may include a public networks, such as the Internet, a telephone line network, and a satellite communication network, various kinds of local area networks (LAN) including Ethernet (registered trademark), a wide area network (WAN), and the like. Moreover, the network 30 may include a dedicated network, such as an Internet protocol-virtual private network (IP-VPN). Furthermore, the network 30 may include wireless communication networks, such as Wi-Fi (registered trademark) and Bluetooth (registered trademark).

As above, the configuration example of the information processing system according to the present embodiment has been explained. Note that the configuration explained above with FIG. 3 is only one example, and the configuration of the information processing system according to the present embodiment is not limited to the example. The configuration of the information processing system according to the present embodiment can be changed flexibly according to a specification and use.

1.3. Functional Configuration Example of Autonomous Operation Unit 10

Figure 4:
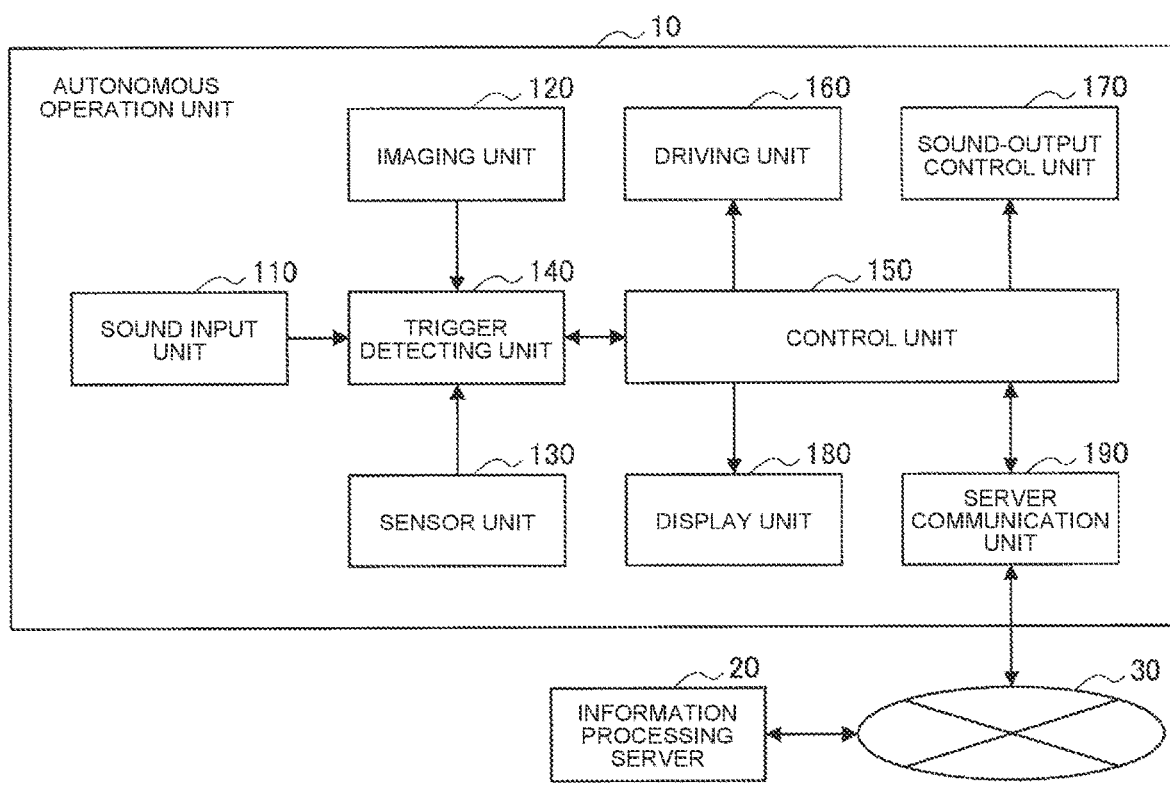
FIG. 4 is a block diagram illustrating a functional configuration example of an autonomous operation unit according to the embodiment.

Next, a functional configuration example of the autonomous operation unit 10 according to the present embodiment will be explained. FIG. 4 is a block diagram illustrating the functional configuration example of the autonomous operation unit 10 according to the embodiment. As illustrated in FIG. 4, the autonomous operation unit 10 according to the present embodiment includes a sound input unit 110, an imaging unit 120, the sensor unit 130, a trigger detecting unit 140, the control unit 150, a driving unit 160, a sound output unit 170, a display unit 180, and a server communication unit 190.

Sound Input Unit 110

The sound input unit 110 according to the present embodiment collects a speech sound of a user, an environmental noise, and the like. For this purpose, the sound input unit 110 according to the present embodiment includes a microphone.

Imaging Unit 120

The imaging unit 120 according to the present embodiment images captures an image of a user or a surrounding environment. For this purpose, the imaging unit 120 according to the present embodiment includes an imaging device.

Sensor Unit 130

The sensor unit 130 according to the present embodiment collects sensing data relating to the user, the surrounding environment, or the autonomous operation unit 10 by various kinds of sensing devices. The sensor unit 130 according to the present embodiment includes, for example, a ToF sensor, an inertial sensor, an infrared sensor, an illuminance sensor, a millimeter-wave radar, a touch sensor, a global navigation satellite system (GLASS) signal receiver, and the like.

Trigger Detecting Unit 140

The trigger detecting unit 140 according to the present embodiment detects various kinds of triggers described above based on various kinds of data collected by the sound input unit 110, the imaging unit 120, and the sensor unit 130.

For example, the trigger detecting unit 140 according to the present embodiment detects a specific word (wake up word) based on a speech sound collected by the sound input unit 110 and a specific speech expression freely registered by the user.

Moreover, for example, the trigger detecting unit 140 according to the present embodiment performs detection of the face or body of the user, or a specific gesture based on an image captured by the imaging unit 120.

Furthermore, the trigger detecting unit 140 according to the present embodiment detects lifting or putting to stand still of the autonomous operation unit 10 by the user based on acceleration data collected by the sensor unit 130.

Control Unit 150

The control unit 150 according to the present embodiment controls respective components included in the autonomous operation unit 10. As described above, the control unit 150 according to the present embodiment controls transition of plural states relating to the speech recognition processing with the autonomous operation unit 10 based on the respective triggers detected by the trigger detecting unit 140. Details of functions of the control unit 150 according to the present embodiment will be described later separately.

Driving Unit 160

The driving unit 160 according to the present embodiment performs various kinds of actions based on a control by the control unit 150. The driving unit 160 according to the present embodiment may include, for example, plural actuators (motor or the like), wheels, and the like.

Sound Output Unit 170

The sound output unit 170 according to the present embodiment performs output of a system sound and the like based on a control by the control unit 150. For this purpose, the sound output unit 170 according to the present embodiment includes an amplifier and a speaker.

Display Unit 180

The display unit 180 according to the present embodiment performs presentation of visual information based on a control by the control unit 150. The display unit 180 according to the present embodiment includes, for example, an LED, an OLED, or the like corresponding to an eye.

Server Communication Unit 190

The server communication unit 190 according to the present embodiment performs data communication with the information processing server 20 through the network 30. For example, the server communication unit 190 according to the present embodiment transmits a speech sound of the user collected by the sound input unit 110 to the information processing server 20, and receives speech recognition result corresponding to the speech sound and response data.

As above, the functional configuration example of the autonomous operation unit 10 according to the present embodiment has been explained. Note that the configuration explained with FIG. 4 is only one example, and the functional configuration of the autonomous operation unit 10 according to the present embodiment is not limited to the example. The functional configuration of the autonomous operation unit 10 according to the present embodiment can be changed flexibly according to a specification and use.

1.4. Functional Configuration Example of Information Processing Server 20

Figure 5:
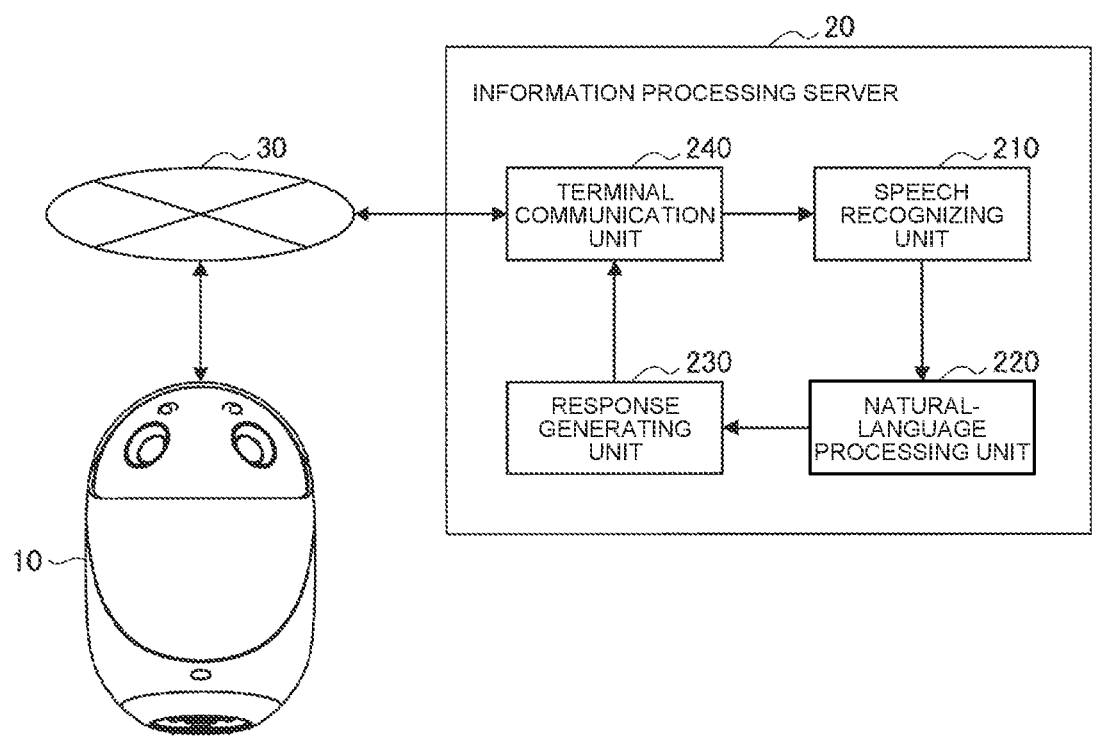
FIG. 5 is a block diagram illustrating a functional configuration example of an information processing server according to the embodiment.

Next, a functional configuration example of the information processing server 20 according to the present embodiment will be explained. FIG. 5 is a block diagram illustrating a functional configuration example of the information processing server 20 according to the present embodiment. As illustrated in FIG. 5, the information processing server 20 according to the present embodiment includes a speech recognizing unit 210, a natural-language processing unit 220, a response generating unit 230, and a terminal communication unit 240.

Speech Recognizing Unit 210

The speech recognizing unit 210 according to the present embodiment performs automatic speech recognition (ASR) based on a speech sound received from the autonomous operation unit 10, and converts the speech sound into a character string.

Natural-Language Processing Unit 220

The natural-language processing unit 220 according to the present embodiment performs natural language understanding (NLU) processing based on the character string generated by the speech recognizing unit 210, and extracts an intention of the speech of the user.

Response Generating Unit 230

The response generating unit 230 according to the present embodiment generates response data to the intention of the speech based on the intention of the speech of the user extracted by the natural-language processing unit 220. The response generating unit 230 generates, for example, an answer sound to a question of the user, and the like.

Terminal Communication Unit 240

The terminal communication unit 240 according to the present embodiment performs data communication with the autonomous operation unit 10 through the network 30. For example the terminal communication unit 240 according to the present embodiment receives a speech sound from the autonomous operation unit 10, and transmits a character string corresponding to the speech sound, response data, and the like to the autonomous operation unit 10.

As above, the functional configuration example of the information processing server 20 according to the present embodiment has been explained. Note that the above configuration explained with FIG. 5 is only one example, and the functional configuration of the information processing server 20 according to the present embodiment is not limited to the example. The functional configuration of the information processing server 20 according to the present embodiment can be changed flexibly according to a specification and use.

1.5. Details of Functions

Next, the functions of the autonomous operation unit 10 according to the present embodiment will be explained in detail. First, the transition from the normal state to the first active state will be explained. As described above, the control unit 150 according to the present embodiment causes the autonomous operation unit 10 to transition from the normal state to the first active state based on various kinds of environmental triggers detected by the trigger detecting unit 140.

Figure 6:
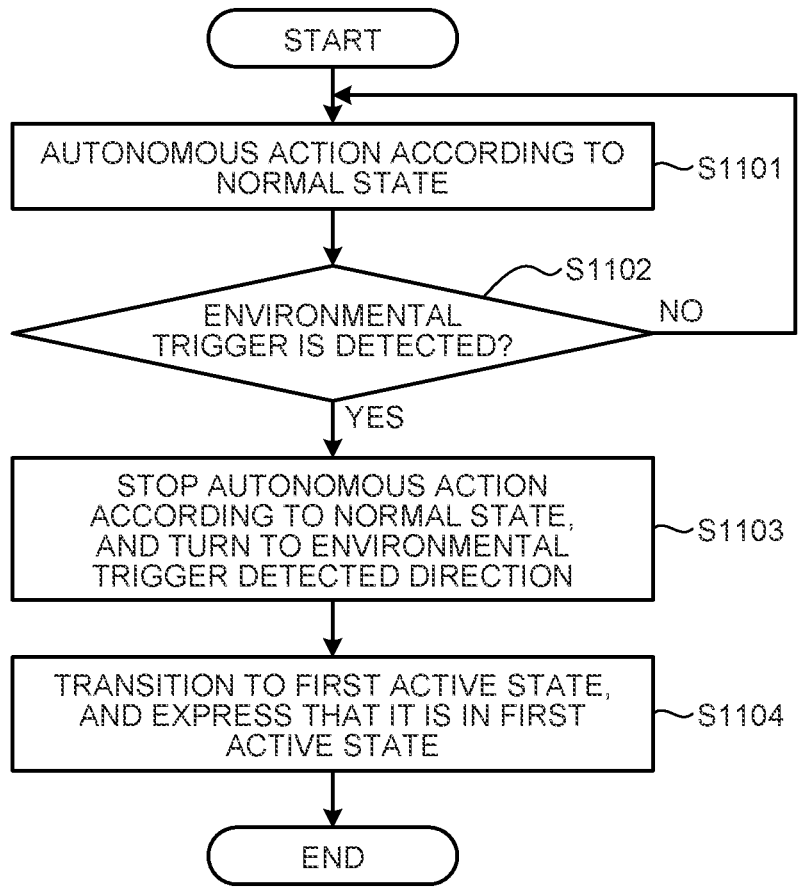
FIG. 6 is a flowchart illustrating a flow of transition from a normal state to a first active state according to the embodiment.

FIG. 6 is a flowchart illustrating a flow of transition from the normal state to the first active state according to the embodiment. Referring to FIG. 6, first, the control unit 150 causes the autonomous operation unit 10 to perform autonomous actions according to the normal state (S1101).

Subsequently, the trigger detecting unit 140 according to the present embodiment attempts to detect an environmental trigger based on various kinds of data collected by the sound input unit 110, the imaging unit 120, and the sensor unit 130 (S1102).

When an environmental trigger is not detected (S1102: NO), the autonomous operation unit 10 returns to step S1101.

On the other hand, when the trigger detecting unit 140 detects an environmental trigger (S1102: YES), the control unit 150 causes the autonomous operation unit 10 to stop the autonomous actions according to the normal sate, and to turn to a direction of environmental trigger detection, for example, to a direction from which a moving body (the body of the user, or the like) or a sudden sound is detected (S1103).

Subsequently, the control unit 150 causes the autonomous operation unit 10 to transition to the first active state, and causes the display unit 180, the driving unit 160, and the like to make an expression indicating that it is in the first active state (S1104).

As above, the flow of transition from the normal state to the first active state according to the present embodiment has been explained. As described, the autonomous operation unit 10 according to the present embodiment prepares for an inquiry from the user by estimating the possibility of speech of the user from various kinds of environmental triggers, and attempts to reduce the volume of the operating noise by stopping the autonomous actions, or the like. With such a control, it is possible to avoid, when a user output a speech, the operating noise from disturbing collection of a sound from the speech, and to implement speech recognition with higher accuracy.

The control unit 150 according to the present embodiment may control the transition to the first active state when the trigger detecting unit 140 detects a single trigger out of the various kinds of environmental triggers illustrated in FIG. 2, or may control the transition to the first active state based on a combination of plural environmental triggers.

Figure 7:
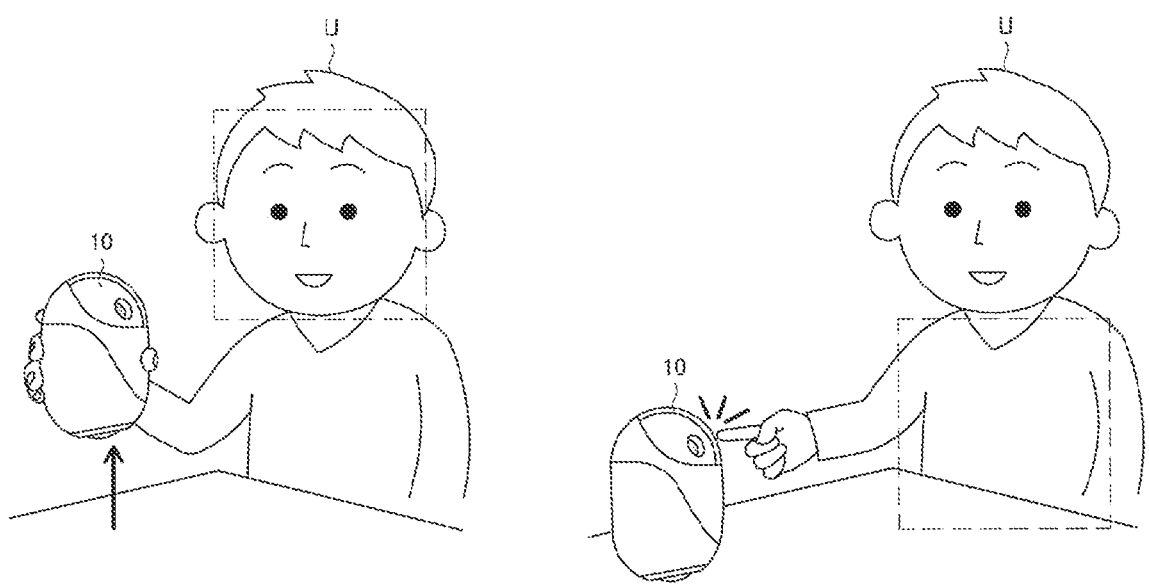
FIG. 7 is a diagram for explaining about a state transition based on a combination of triggers according to the embodiment.

FIG. 7 is a diagram for explaining the state transition based on a combination of triggers according to the embodiment. For example, in a case illustrated on a left side of FIG. 7, the control unit 150 causes the autonomous operation unit 10 to transition to the first active state based on that lifting of the autonomous operation unit 10 by a user U is detected and that the face of the user U is detected.

Moreover, in a case of the example illustrated on a right side of FIG. 7, the control unit 150 causes the autonomous operation unit 10 to transition to the first active state based on that a touch (for example, a poke or the like) to the autonomous operation unit 10 and that the body of the user U is detected.

As described, the control unit 150 according to the present embodiment can control the state transition of the autonomous operation unit 10 based on detection of plural triggers. According to the control, it is possible to estimate a state more accurately compared to the case of using a single trigger, and appropriate state transition according to a situation can be implemented.

Although FIG. 7 illustrates the case in which the control unit 150 controls the transition from the normal state to the first active state based on plural environmental triggers, the control unit according to the present embodiment may control the state transition based on a combination of the respective triggers, regardless of a type of the triggers.

As explained at step S1104 in FIG. 6, the control unit 150 according to the present embodiment controls the display unit 180 and the driving unit 160 with the transition to the first active state, and causes the autonomous operation unit 10 to make an expression indicating that it is in the first active state.

Figure 8:
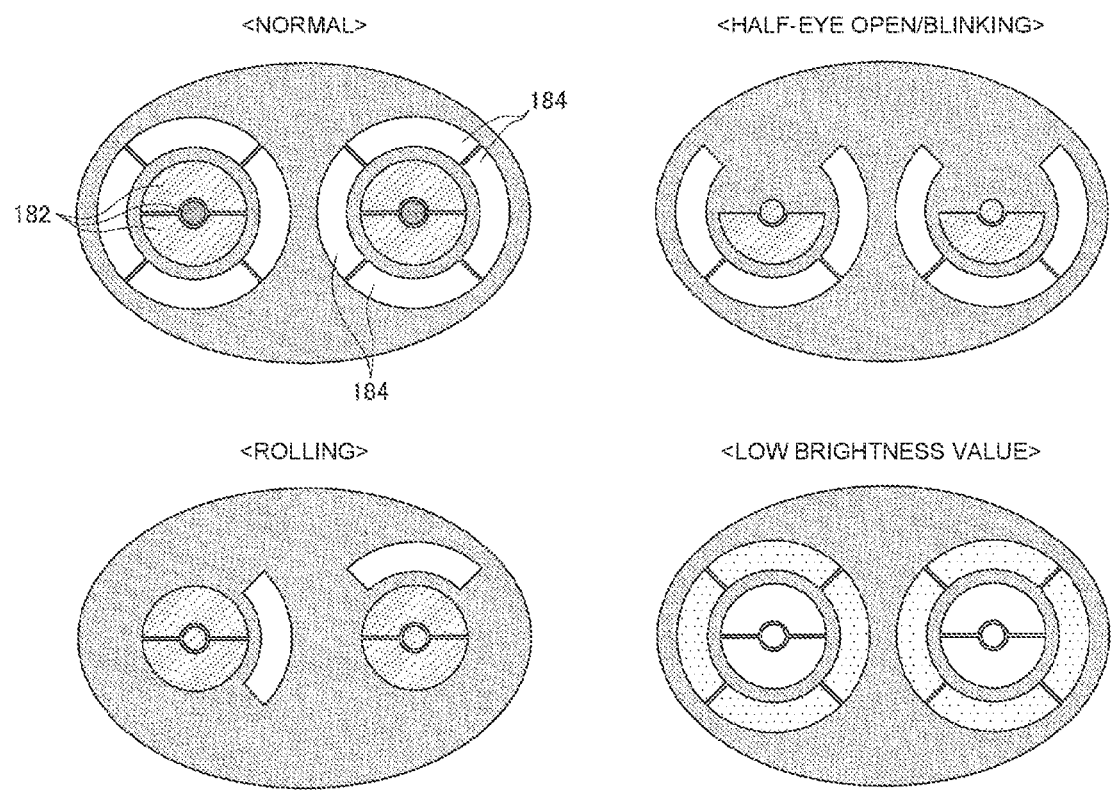
FIG. 8 is a diagram for explaining about an expression of a state by an eye part expression according to the embodiment.

FIG. 8 is a diagram for explaining about an expression of a state by an eye part expression according to the embodiment. As illustrated in FIG. 8, an eye part of the autonomous operation unit 10 according to the present embodiment includes plural RGB_LEDs 182 and white LEDs 184.

In one example illustrated in FIG. 8, the eye part includes the three RGB_LEDs 182 corresponding to a pupil and an iris, and the four white LEDs 184 corresponding to so-called white of the eye.

According to the above configuration, various eye expressions, for example, expression of a half-open eye or the like, expression with blinking, rolling, or the like, lighting in various colors or at a low brightness value, and the like can be made as illustrated.

The control unit 150 according to the present embodiment makes the display unit 180 to make expressions of being in the respective states by causing it to make respective different expressions depending on a state. For example, the control unit 150 may be configured to change the color of light emitted by the RGB_LED 182 with transition from the normal state to the first active state, to express that it is in the first active state.

Although FIG. 8 illustrates the case in which the eye part according to the embodiment is implemented by plural LEDs, the eye part according to the present embodiment may be implemented by a single or independent two OLED, or the like.

Subsequently, the flow of transition from the first active state to the second active state according to the present embodiment will be explained. As described above, the control unit 150 according to the present embodiment causes the autonomous operation unit 10 to transition from the first active state to the second active state based on a prefix trigger or a postfix trigger detected by the trigger detecting unit 140.

Figure 9:
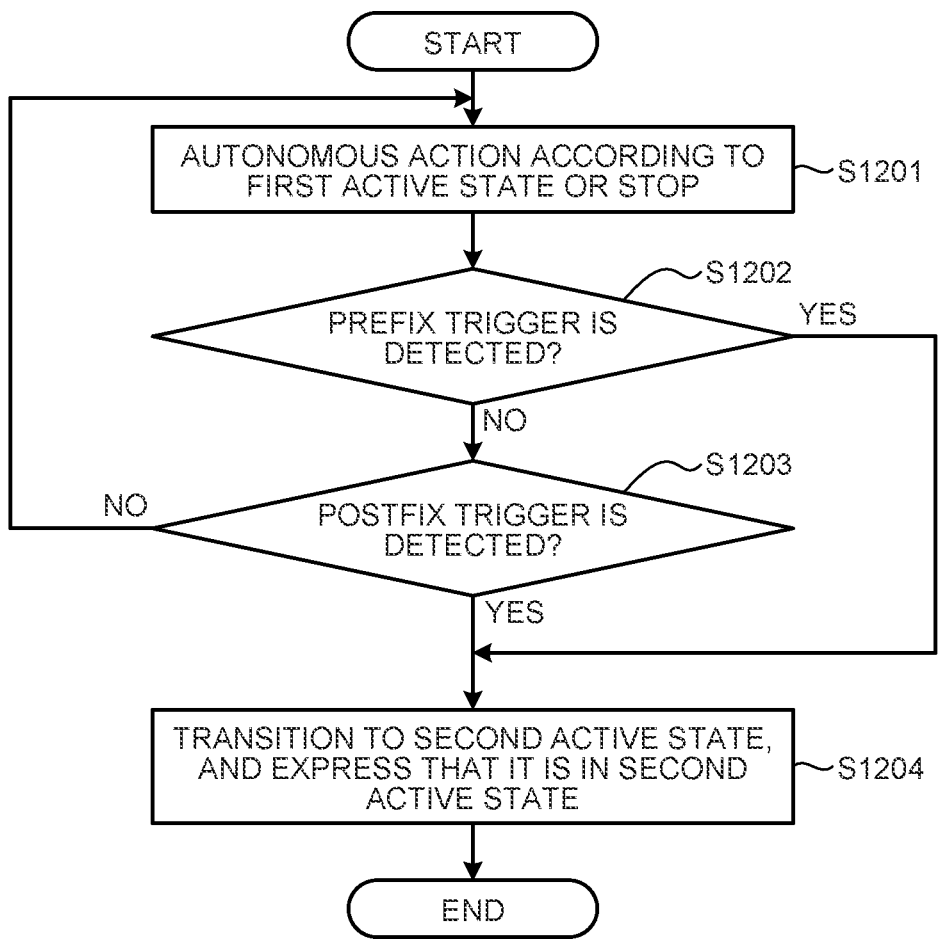
FIG. 9 is a flowchart illustrating a flow of transition from the first active state to a second active state according to the embodiment.

FIG. 9 is a flowchart illustrating a flow of transition from the first active state to a second active state according to the embodiment. Referring to FIG. 9, first, the control unit 150 let the autonomous operation unit 10 perform an autonomous action according to the first active state or stop the action (S1201).

Subsequently, the trigger detecting unit 140 attempts to detect a prefix trigger indicating an intention of an anterior inquiry with respect to the autonomous operation unit 10 (S1202).

Moreover, the trigger detecting unit 140 attempts to detect a postfix trigger indicating an intention of a posterior inquiry with respect to the autonomous operation unit 10 (S1203).

When a prefix trigger is not detected (S1202: NO) and when a postfix trigger is not detected (S1203) NO), the autonomous operation unit 10 returns to step S1201.

On the other hand, when a prefix trigger is detected (S1202: YES), or when a postfix trigger is detected (S1203: YES), the control unit 150 causes the autonomous operation unit 10 to transition to the second active state, and cause the autonomous operation unit 10 to make an expression indicating that it is in the second active state (S1204).

As above, the flow of the transition from the first active state to the second active state according to the present embodiment has been explained. As described above, the prefix trigger according to the present embodiment includes detection of a specific gesture, touch (poke or the like) to the autonomous operation unit, a sudden sound, a face, and the like, in addition to a specific word (wake up word).

In the first active state, when the prefix trigger as described above is detected before start of a speech of the user, the control unit 150 according to the present embodiment may cause the autonomous operation unit 10 to transition to the second active state, and to transmit a speech sound collected after the detection of the prefix trigger to the information processing server 20.

As described, in the speech recognition processing through the autonomous operation unit 10 according to the present embodiment, a speech of a wake up word is not necessarily required. Therefore, the autonomous operation unit 10 according to the present embodiment can detect an instruction to start the speech recognition from the user highly accurately even in a noisy environment, and can improve the complicated procedure relating to a speech of a wake up word and the processing time necessary of the recognition processing. Moreover, by using various kinds of prefix triggers other than the wake up word, a natural conversation can be made without speaking the wake up word each time.

Furthermore, by using prefix triggers other than the wake up word, it becomes possible to widely support users that have difficulty in speaking a specific word, for example, avoiding a situation that a foreigner needs to speak a wake up word in a non-native language, or the like.

Moreover, even when a wake up word is used, the present embodiment allows it to be designed such that the wake up word can be registered as the user wishes.

Next, details of a postfix trigger according to the present embodiment will be explained. The postfix triggers according to the present embodiment includes the same thing to be detected as the prefix trigger described above, but trigger detection timing with respect to a speech is different from that of the prefix trigger.

Figure 10:
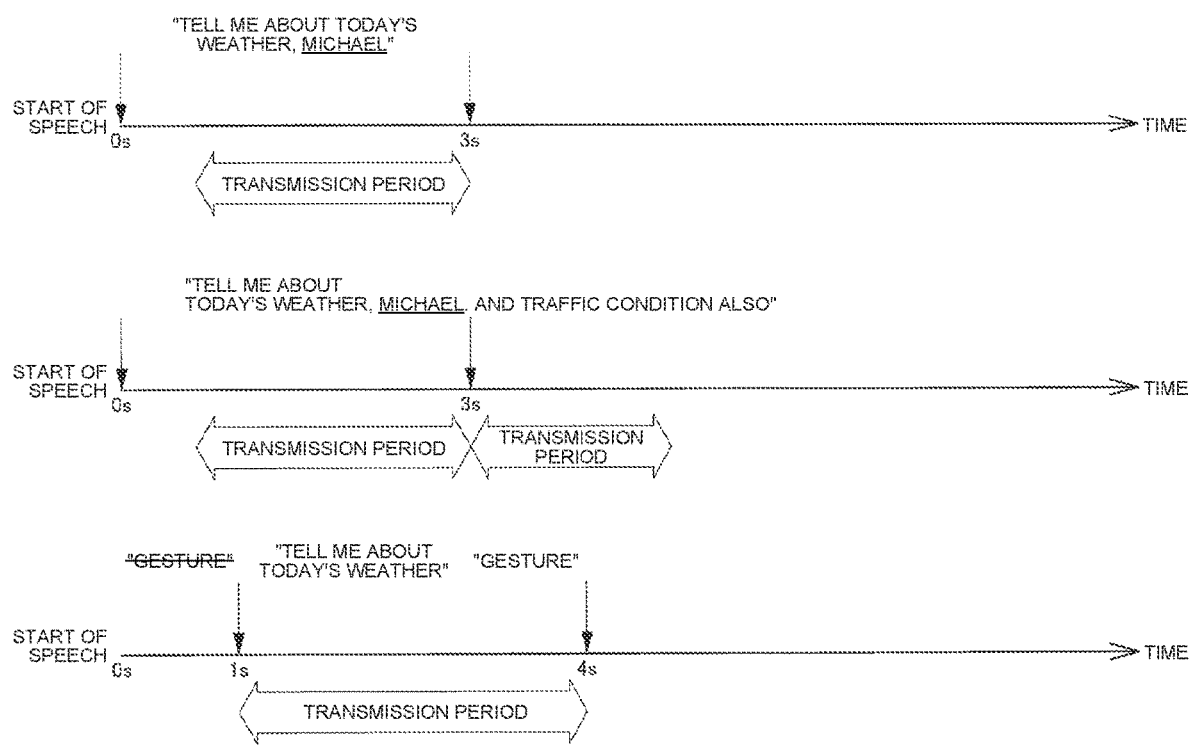
FIG. 10 is a diagram for explaining about a postfix trigger according to the embodiment.
Figure 11:
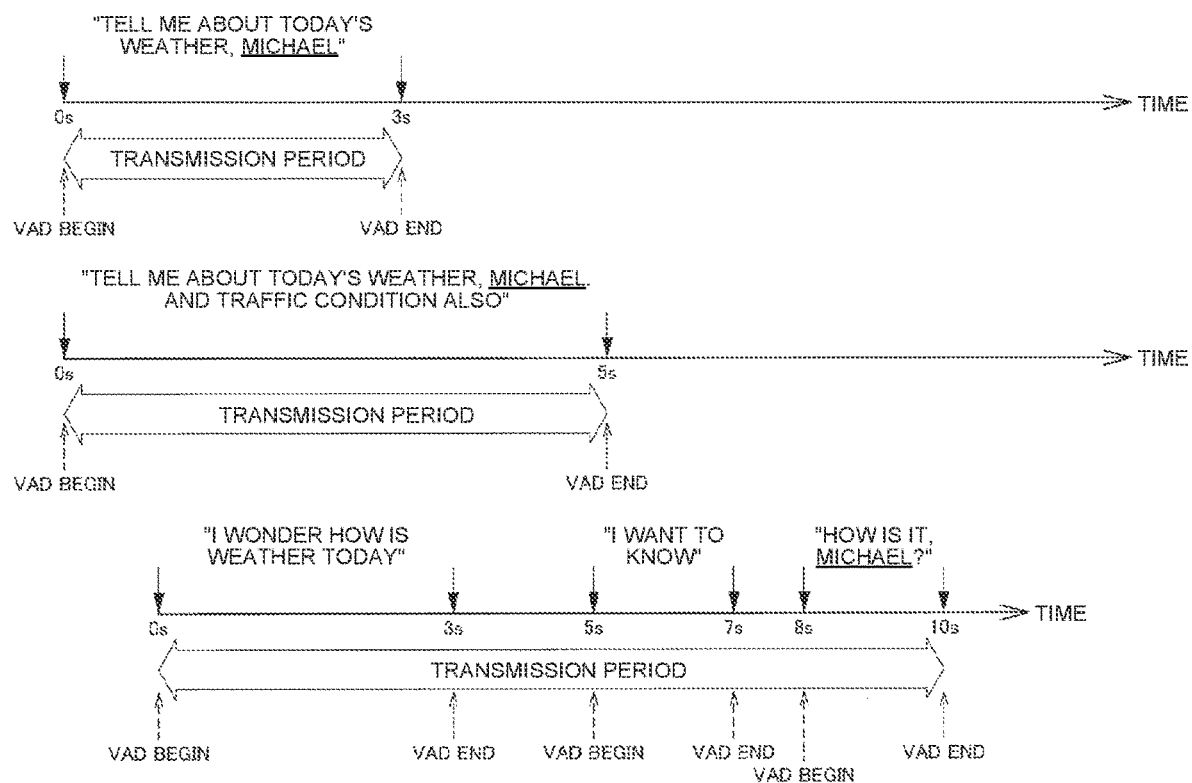
FIG. 11 is a diagram for explaining about a postfix trigger according to the embodiment.

FIG. 10 and FIG. 11 are diagrams for explaining about the postfix trigger according to the embodiment. For example, in an upper part of FIG. 10, an example in which the postfix trigger is a speech corresponding to a name of the autonomous operation unit 10, "Michael" is illustrated.

First, the control unit 150 according to the present embodiment performs a control such that a speech sound of the user collected by the sound input unit 110 is accumulated in the first active state. At this point, when the postfix trigger is detected as illustrated in the upper part of FIG. 10, the control unit 150 causes the autonomous operation unit 10 to transition to the second active state, and with the transition, to transmit the speech sound accumulated in the first active state to the information processing server 20.

In this case, the control unit 150 may control to transmit the speech sound accumulated in a predetermined period from a point of time when the postfix trigger is detected up to a predetermined time prior thereto, to the information processing server 20.

Moreover, when a specific word corresponding to the postfix trigger is detected in the middle of a speech of the user, the control unit 150 may handle the specific word as both the postfix trigger and the prefix trigger.

For example, in the case of an example illustrated in a middle part of FIG. 10, the specific word, "Michael" is detected in the middle of the speech. In this case, the control unit 150 may be configured to handle the specific word as the postfix trigger, and to control to transmit a sound accumulated in a predetermined period from the point of time when the specific word is detected until a predetermined time, to the information processing server 20.

Moreover, at the same time, the control unit 150 may be configured to handle the specific word, "Michael" as the prefix trigger, and control to transmit a speech sound collected after the point of time when the specific word is detected, to the information processing server 20.

The postfix trigger according to the present embodiment is not limited to the specific word as described above, but may be, for example, a specific gesture. For example, in the case of an example illustrated in a lower part of FIG. 10, the user performs a specific gesture corresponding to the prefix trigger before the speech.

As illustrated herein, even if the trigger detecting unit 140 cannot detect the specific gesture described above, by detecting the specific gesture performed again after the speech as the postfix trigger, a sound accumulated in a period from the point of time when the postfix trigger is detected up to a predetermined time prior thereto, to the information processing server 20.

In the above description, the case in which the control unit 150 controls transmission of the accumulated sound based on predetermined time from the point of time when the postfix trigger is detected has been explained, but the control unit 150 according to the present embodiment may control a section of an accumulated sound to be transmitted to the information processing server 20 based on a voice activity detection (VAD) result.

For example, in the case of an example illustrated in an upper part of FIG. 11, the control unit 150 can control to transmit a sound accumulated in a period from a start point (VAD BEGIN) of the sound section including the postfix trigger until an end point (VAD END), to the information processing server 20.

Moreover, the control unit 150 can perform a similar control also when the postfix trigger is detected in the middle of a speech. In the case of an example illustrated in a lower part of FIG. 11, the postfix trigger is detected in the middle of a speech, but also in this case, by using a result of the voice activity detection, what is spoken can be transmitted to the information processing server 20 without being missed.

Furthermore, when speech sounds is collected successively in predetermined time, the control unit 150 may control to transmit the plural successive accumulated sounds to the information processing server 20 based on a single postfix trigger as a batch.

For example, in the case of an example illustrated in FIG. 11, the user makes successive three speeches, and the postfix trigger is included only in the third speech. In this case, the control unit 150 can control to transmit the accumulated sound corresponding to the three speeches to the information processing server 20 as a batch by the detected single postfix trigger based on a fact that these three speeches are output successively within predetermined time.

The successive speeches as described above may be of plural users. FIG. 12 is a diagram for explaining about a postfix trigger corresponding to a conversation among users according to the embodiment. For example, as an example illustrated in an upper part of FIG. 12, a situation in which a user U1 and a user U2 are having conversation is assumed.

At this time, the control unit 150 causes the autonomous operation unit 10 to transition from the normal state to the first active state based on a fact that the trigger detecting unit 140 has detected the body of the user U1 and the face of the user U2, that is, an environmental trigger has been detected in this example, and to perform collection and accumulation of speeches UO1 and UO2.

As illustrated in a lower part of FIG. 12, when the user U1 output a speech including the specific word "Michael", the control unit 150 controls to transition to the second active state based on the above specific word detected by the trigger detecting unit 140, that is, the postfix trigger, and to transmit speech sounds corresponding to the speeches UO1 and UO2 accumulated in the first active state to the information processing server 20.

According to the control described above, as illustrated, speech recognition of voice speeches of a conversation among users can be speech-recognized chronologically, and it becomes possible to output a reply suitable for the context of the speech by a system voice SO1.

As above, the postfix trigger according to the present embodiment has been explained with specific examples. Thus, the control unit 150 according to the present embodiment may be configured to cause the autonomous operation unit 10 to transition to the second active state, and to transmit at least a speech sound accumulated before the detection of the postfix trigger to the information processing server 20 when a postfix trigger indicating an intention of posterior inquiry with respect to the autonomous operation unit 10 is detected after a speech of the user has started.

According to the functions described above of the control unit 150 according to the present embodiment, the speech recognition processing is enabled even without speaking a wake up word each time before an inquiry, and more natural conversation can be made.

Next, transition to the second active state by an active speech and behavior of the autonomous operation unit 10 according to the present embodiment will be explained. The control unit 150 according to the present embodiment may be configured to cause the autonomous operation unit 10 to output an active speech and behavior to the user, and to induce a start of conversation with the user. When the user responses to the speech and behavior, the control unit 150 may cause the autonomous operation unit 10 to transition to the second active state.

Figure 13:
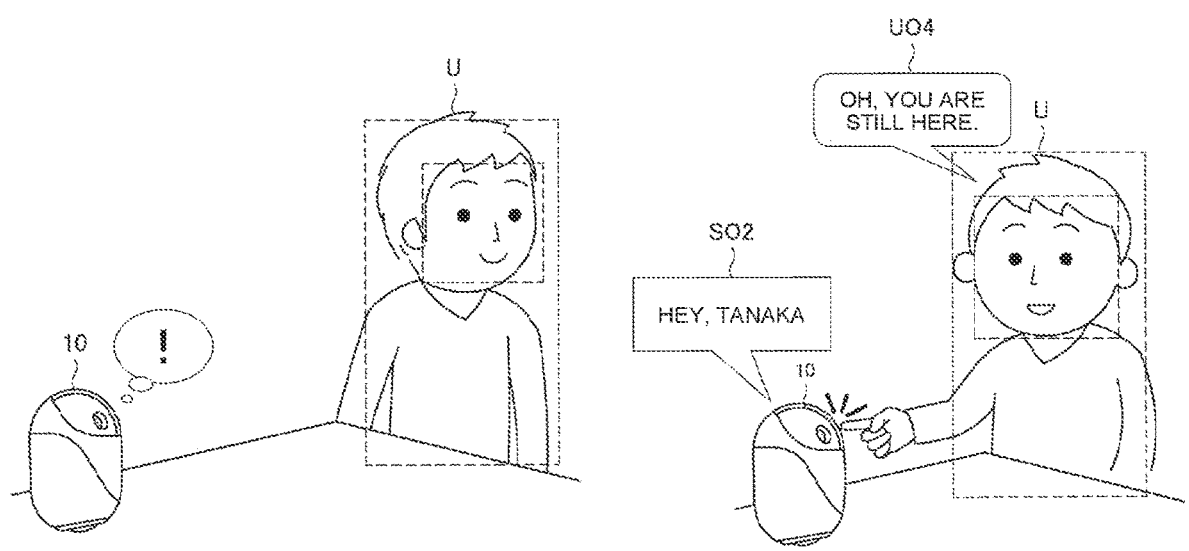
FIG. 13 is a diagram for explaining about transition to the second active state of the autonomous operation unit by an active speech and behavior according to the embodiment.

FIG. 13 is a diagram for explaining about transition to the second active state of the autonomous operation unit by an active speech and behavior according to the embodiment. For example, when the trigger detecting unit 140 detects the user U in the first active state as illustrated, the control unit 150 controls the driving unit 160 and the sound output unit 170 to cause the autonomous operation unit 10 to make an active speech and behavior to the user.

In the case of the example illustrated in FIG. 13, the control unit 150 controls the driving unit 160 to move the autonomous operation unit 10 to a position near the front of the user U, and causes the sound output unit 170 to output a system sound SO2 corresponding to a call to the user U.

In this case, the user makes a reaction, such as UO4, to the system sound SO2, and the possibility that a conversation continues thereafter is estimated to be high. Therefore, the control unit 150 may cause the autonomous operation unit 10 to transition from the first active state to the second active state when a reaction, such as the speech UO4, is detected by the trigger detecting unit 140.

As described, not just making a passive response, the autonomous operation unit 10 according to the present embodiment can make a chance of a conversation with the user by making an active speech and behavior with respect to the user. According to this function, a more natural and richer conversation can be made, and a high quality experience can be provided to the user.

Figure 14:
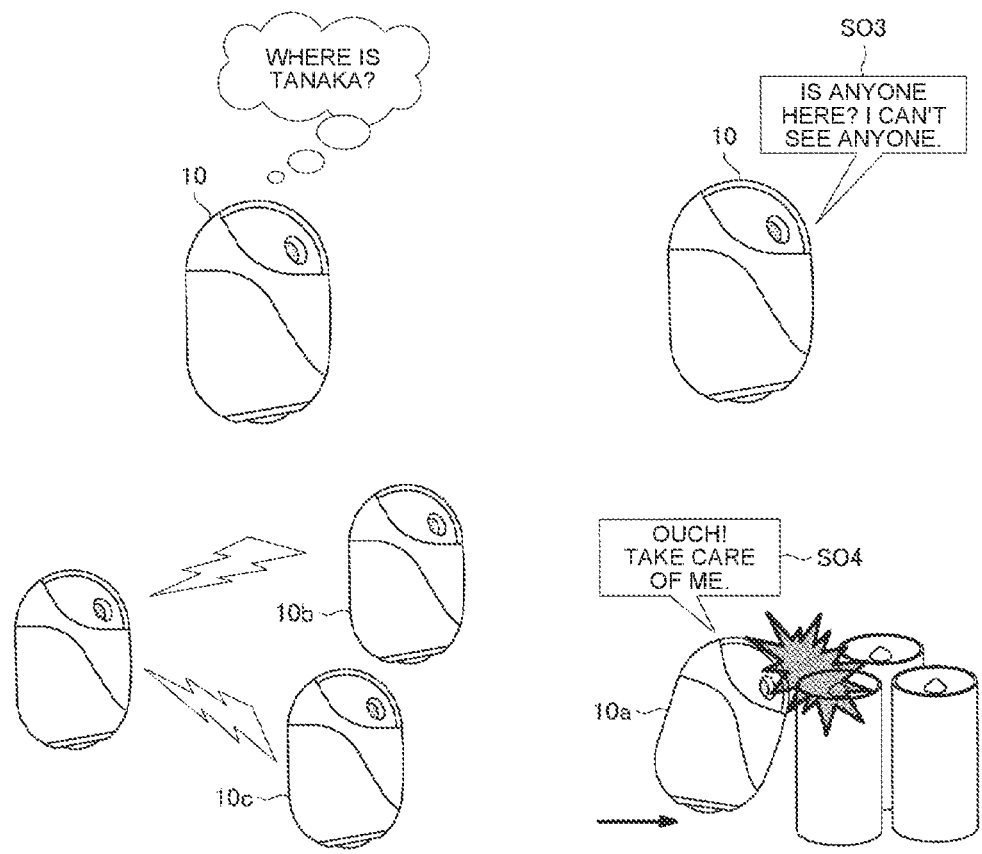
FIG. 14 is a diagram for explaining about maintaining the first active state according to the embodiment.

Moreover, the control unit 150 according to the present embodiment may cause the autonomous operation unit 10 to make a speech and behavior to maintain the first active state when a prefix trigger or a postfix trigger is not detected in the first active state. FIG. 14 is a diagram for explaining about maintaining the first active state according to the embodiment.

When a prefix trigger or a postfix trigger is not detected in the first active state, the control unit 150 may cause the autonomous operation unit 10 to take an action to search for a user as illustrated in an upper left part of the figure. In this case, the control unit 150 may cause the autonomous operation unit 10 to move at a low speed so that the operating noise does not hinder the speech sound collection.

Moreover, for example, as illustrated in an upper right part of the figure, the control unit 150 may cause the sound output unit 170 of the autonomous operation unit 10 to output a system speech SO3 to draw an attention of the user. Moreover, similarly, the control unit 150 may cause the autonomous operation unit 10 to make a speech and attitude to draw an attention of the user as illustrated in a lower right part of the figure.

Furthermore, for example, the control unit 150 may inquire of another unit of the autonomous operation unit 10 about a user detection status or an speech-sound accumulate status as illustrated in a lower left part of the figure. Thus, the autonomous operation unit 10 according to the present embodiment can share various kinds of information and perform cooperative processing by communicating with the other autonomous operation unit 10.

For example, when plural units of the autonomous operation unit 10 are present in an environment, it can be arranged to divide roles such that one unit is responsible for search, and the other unit is responsible for accumulation of a speech sound, or the like. In this case, when a speech sound of the user is detected, the autonomous operation unit 10 that has accumulated the speech sound may share the accumulated speech sound a recognition result of the speech sound with the other autonomous operation unit 10. According to this control, the autonomous operation unit 10 that has failed to collect a speech sound of a user can join a conversation with the user also, and a richer conversation by plural units of the autonomous operation unit 10 and the user can be realized.

As above, the transition from the first active state to the second active state according to the present embodiment has been explained. It is noted that the control unit 150 according to the present embodiment can also cause the autonomous operation unit 10 to transition from the second active state to the second active state directly without going through the first active state.

Figure 15:
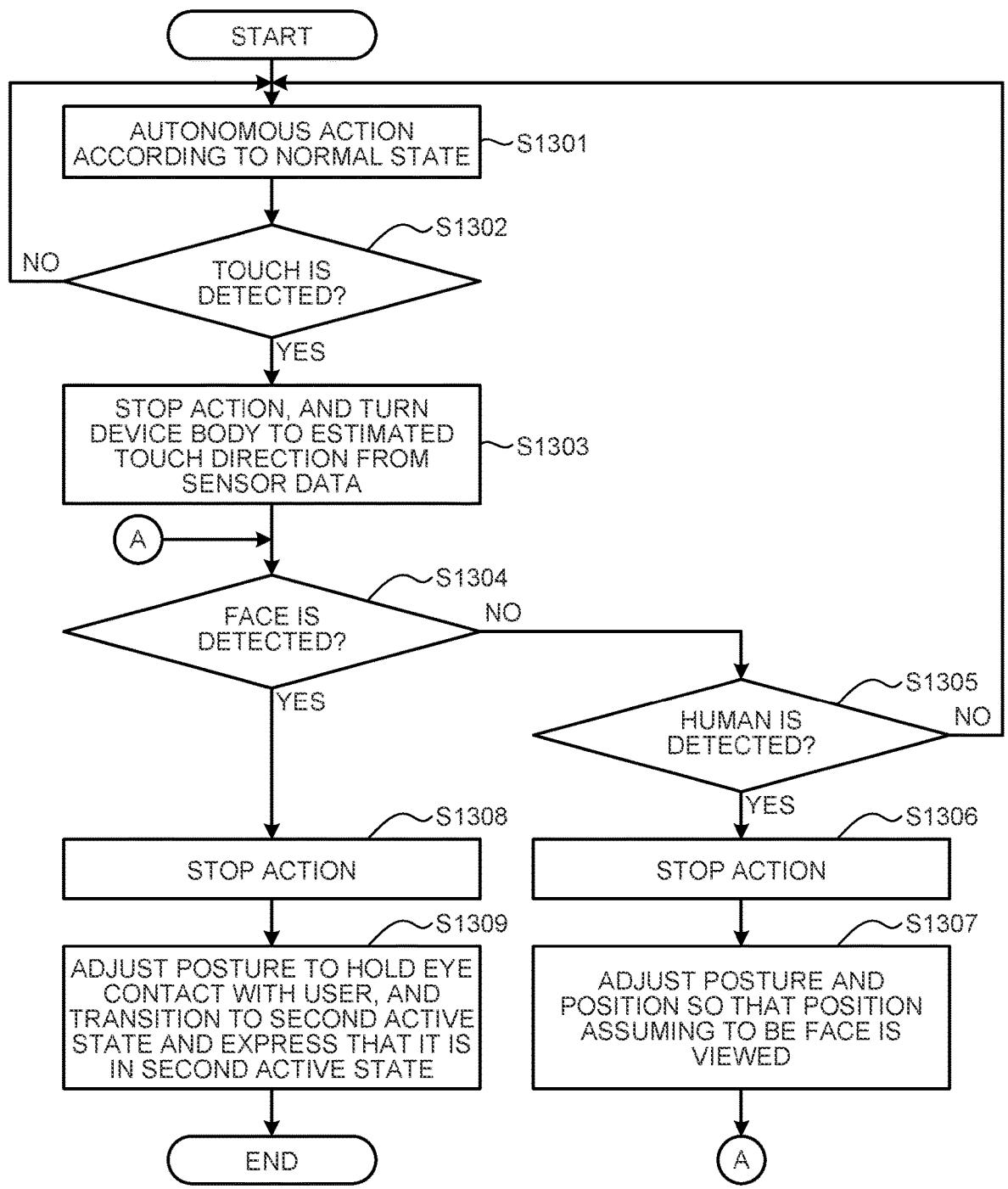
FIG. 15 is a flowchart illustrating a flow of transition from the normal state to the second active state according to the embodiment.

FIG. 15 is a flowchart illustrating a flow of transition from the normal state to the second active state according to the embodiment. Referring to FIG. 15, first, the control unit 150 causes the autonomous operation unit 10 to perform an autonomous action according to the normal state (S1301).

Next, the trigger detecting unit 140 attempts to detect, for example, a touch to the autonomous operation unit 10 or the like by a user (S1302).

When a touch to the autonomous operation unit 10 is not detected (S1302: NO), the autonomous operation unit 10 returns to step S1301.

On the other hand, when the trigger detecting unit 140 detects a touch to the autonomous operation unit 10 (S1302: YES), the control unit 150 stops the action of the autonomous operation unit 10, and causes it to turn the device body toward a touch direction estimated from sensor data (S1303).

Next, the trigger detecting unit 140 attempts to detect the face of the user (S1304).

When the face of the user cannot be detected (S1304: NO), the trigger detecting unit 140 subsequently attempts to detect a human (human body) (S1305).

When the trigger detecting unit 140 cannot detect a human S1305: NO), the autonomous operation unit 10 returns to step S1301.

On the other hand, when the trigger detecting unit 140 detects a human (S1305: YES), the control unit 150 stops the action of the autonomous operation unit 10 (S1306), and subsequently adjusts a posture and a position of the autonomous operation unit 10 so that a position estimated as the face can be viewed (S1307). Moreover, the autonomous operation unit 10 returns to S1304.

On the other hand, when the trigger detecting unit detects the face of the user (S1304: YES), the control unit 150 stops the action of the autonomous operation unit 10 (S1308).

Subsequently, the control unit 150 adjusts the posture of the autonomous operation unit 10, to hold eye touch, and causes it to transition to the second active state, and to perform expression indicating that it is in the second active state (S1309).

As above, an example of the flow of the transition from the normal state to the second active state according to the present embodiment has been described. Although the example in which the transition is performed based on a touch to the autonomous operation unit 10, a face detection, and a human detection has been described in the above explanation using FIG. 15, these are only one example, The autonomous operation unit 10 according to the present embodiment may transition from the normal state to the second active state based on a detection of a specific word or a sudden sound, a detection of a smiling face, or the like.

Next, an example of the expression of a state by a movement of the device body according to the present embodiment will be described. In FIG. 8, the control unit 150 according to the present embodiment causing the display unit 180 to change eye part expression according to the respective states has been described.

The control unit 150 according to the present embodiment can cause the autonomous operation unit 10 to make an expression indicating that it is in the first active state or the second active state by controlling the driving unit 160, other than by the control described above. FIG. 16 is a diagram illustrating an example of an expression of a state by movement of an eye part or a device body according to the present embodiment.

For example, as illustrated in an upper part of FIG. 16, the control unit 150 can control the driving unit 160 to move the entire eye part upward and downward to express a nod, and can show that a speech of the user is being heard. The control unit 150 may express a nod by swinging the entire device body frontward and backward.

Moreover, for example, as illustrate in a middle part of FIG. 16, the control unit 150 can control the driving unit 160 to roll the entire eye part to thereby express a tilt of a head, and to show that a speech of the user is being heard.

Furthermore, for example, as illustrate in a lower part of FIG. 16, the control unit 150 may control the driving unit 160 to swing the entire device body left and right, to show that a speech of the user is being heard.

As described, the autonomous operation unit 10 according to the present embodiment can make rich expressions according to the respective states, such as a gesture of listening to a speech of a user, by movement of the eye part or the device body. According to this arrangement, it is possible to show that a speech sound is being transmitted to the outside clearly to the user, and a conversation respecting the privacy of the user can be implemented.

Figure 17:
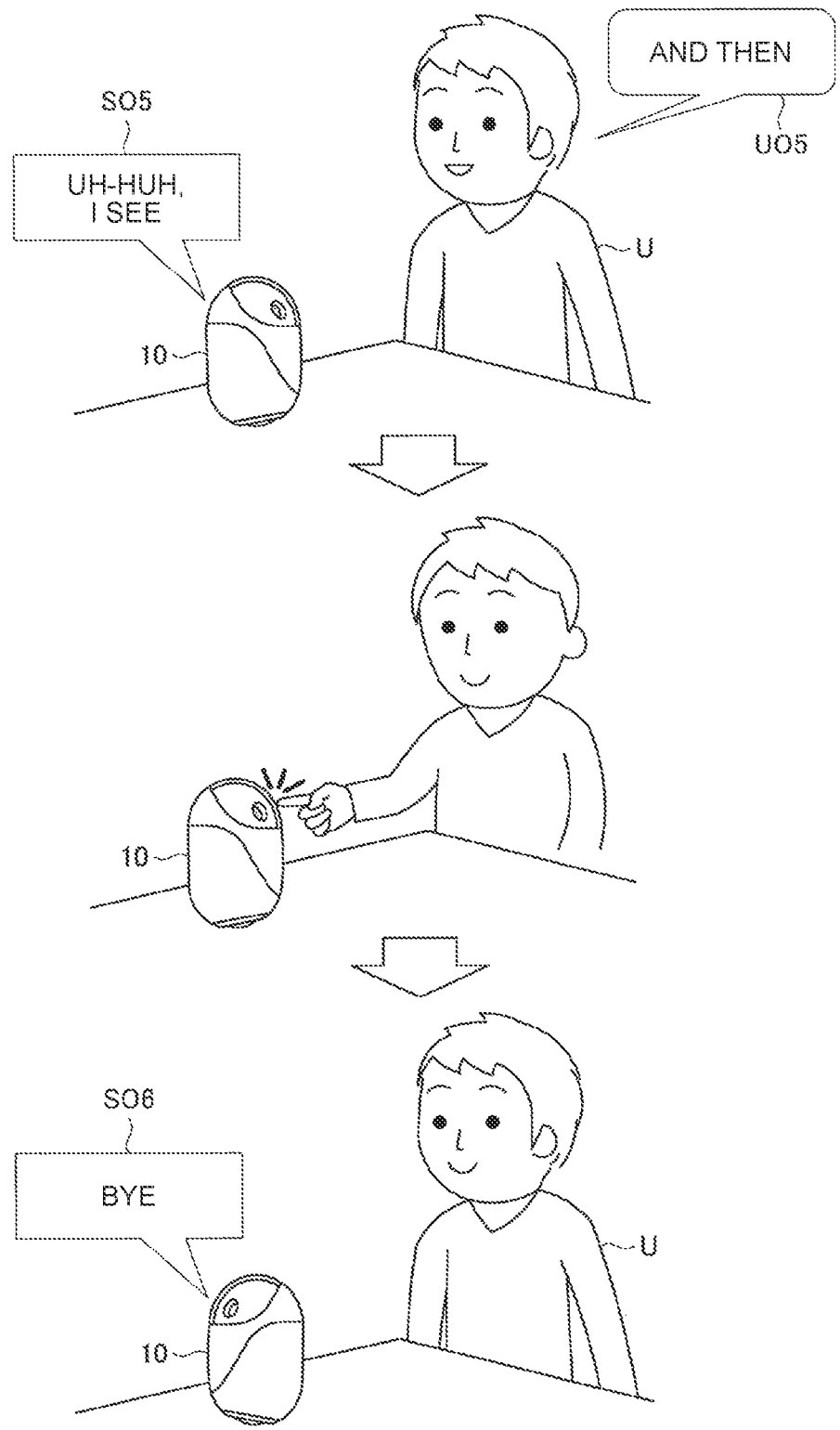
FIG. 17 is a diagram illustrating an example of transition from the second active state according to the embodiment.

Subsequently, transition from the second active state or the first active state to the normal state according to the present embodiment will be explained in detail. FIG. 17 is a diagram illustrating an example of the transition from the second active state according to the embodiment. In an upper part of FIG. 17, a situation of having a conversation between the autonomous operation unit 10 and the user U with a system sound SO5 and a speech UO5 is illustrated.

Subsequently, the user U instructs an end of conversation by touching the autonomous operation unit 10 as illustrated in a middle part. At this time, the trigger detecting unit 140 detects the touch described above as a conversation end trigger.

At this time, the control unit 150 may cause the autonomous operation unit 10 to output a system sound SO6 indicating the end of conversation, or to perform an action of leaving away from the user as illustrated in a lower part. Moreover, at this time, the control unit 150 causes the autonomous operation unit 10 to transition to either the first active state or the normal state. The control unit 150 may be configured to select a state of a transition destination based on a type or a degree of the detected conversation end trigger.

As described, in the speech recognition processing using the autonomous operation unit 10 according to the present embodiment, it is possible for a user to instruct an end of conversation expressly. According to this arrangement, the user can end the transmission of a speech sound to outside on his/her own decision, and the privacy of the user can be more securely protected.

On the other hand, the autonomous operation unit 10 according to the present embodiment can end a conversation with a user autonomously based on a system condition as a conversation end trigger. For example, the control unit 150 may cause the autonomous operation unit 10 to make a speech and behavior to lead to an end of conversation when an accumulation amount or a transmission volume of a speech sound exceeds a threshold, or when an calculation cost in the speech recognition processing exceeds a threshold. The speech and behavior described above is assumed to be, for example, a speech by a system voice saying "I am tired. I will talk to you tomorrow", an expression of a sleepy face, and the like. With such a control, it becomes possible to reduce a communication volume and calculation cost effectively.

Furthermore, the control unit 150 can reduce the communication volume and calculation cost by stopping an active speech and behavior to the user, or by controlling not to respond more than necessary. Moreover, the control unit 150 may perform a control of suppressing the accumulation amount of a speech sound.

Figure 18:
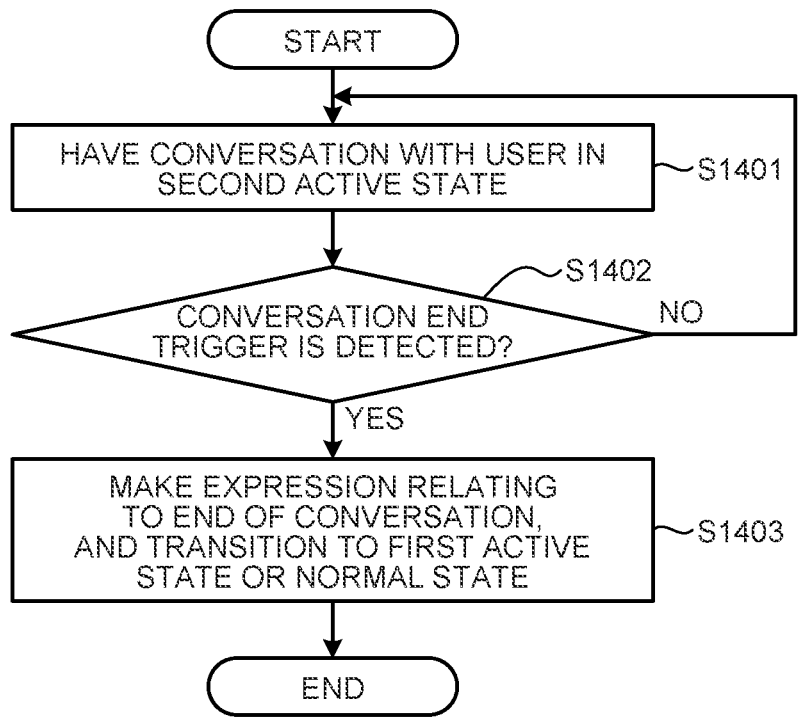
FIG. 18 is a flowchart illustrating a flow of the transition from the second active state according to the embodiment.

As above, a specific example about the transition from the second active state according to the present embodiment has been described. Subsequently, a flow of the transition from the second active state according to the present embodiment will be described. FIG. 18 is a flowchart illustrating a flow of the transition from the second active state according to the present embodiment.

Referring to FIG. 18, first, the control unit 150 controls a conversation with a user in the second active state (S1401).

Subsequently, the trigger detecting unit 140 attempts to detect a conversation end trigger (S1402).

When a conversation end trigger is not detected at this point (S1402: NO), the autonomous operation unit 10 returns to step S1401.

On the other hand, when the trigger detecting unit 140 has detected a conversation end trigger (S1402: YES), the control unit 150 causes the autonomous operation unit 10 to make an expression relating to an end of conversation, and to transition to the first active state or the normal state (S1403).

1.6. Hardware Configuration Example

Figure 19:
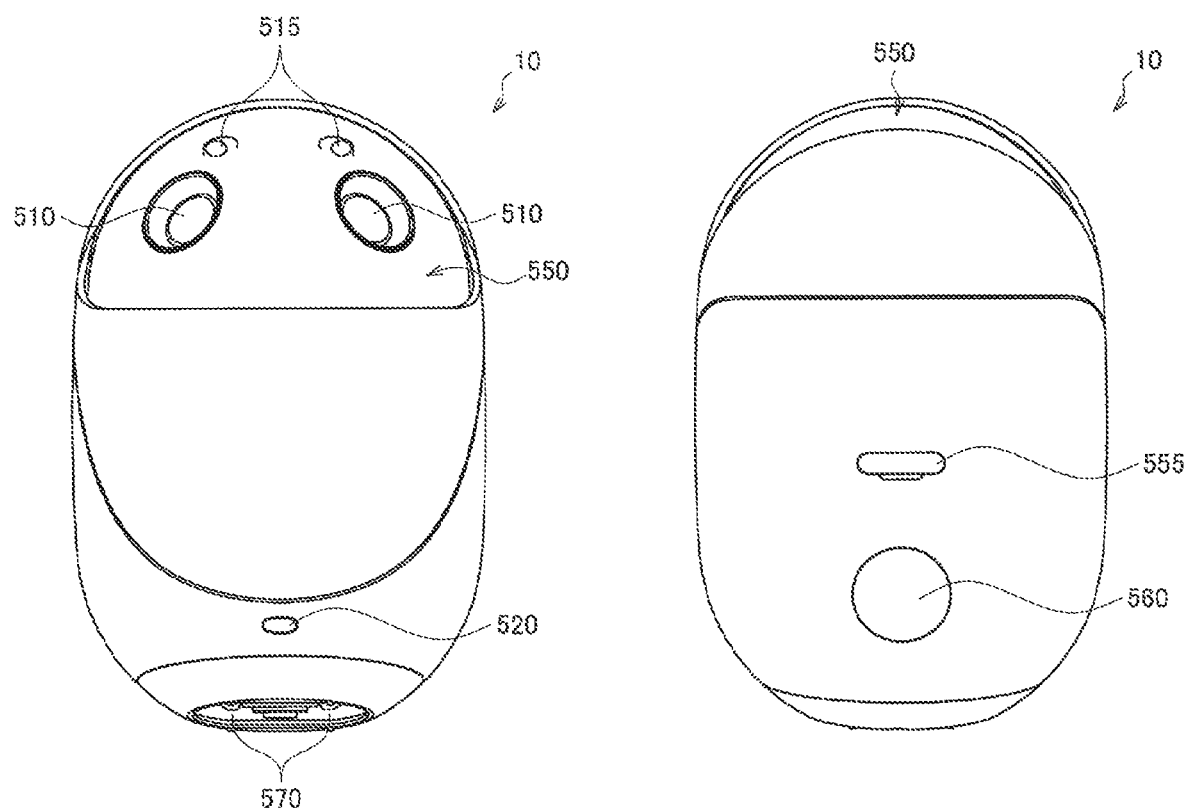
FIG. 19 is a front view and a rear view of the autonomous operation unit according to the embodiment.
Figure 20:
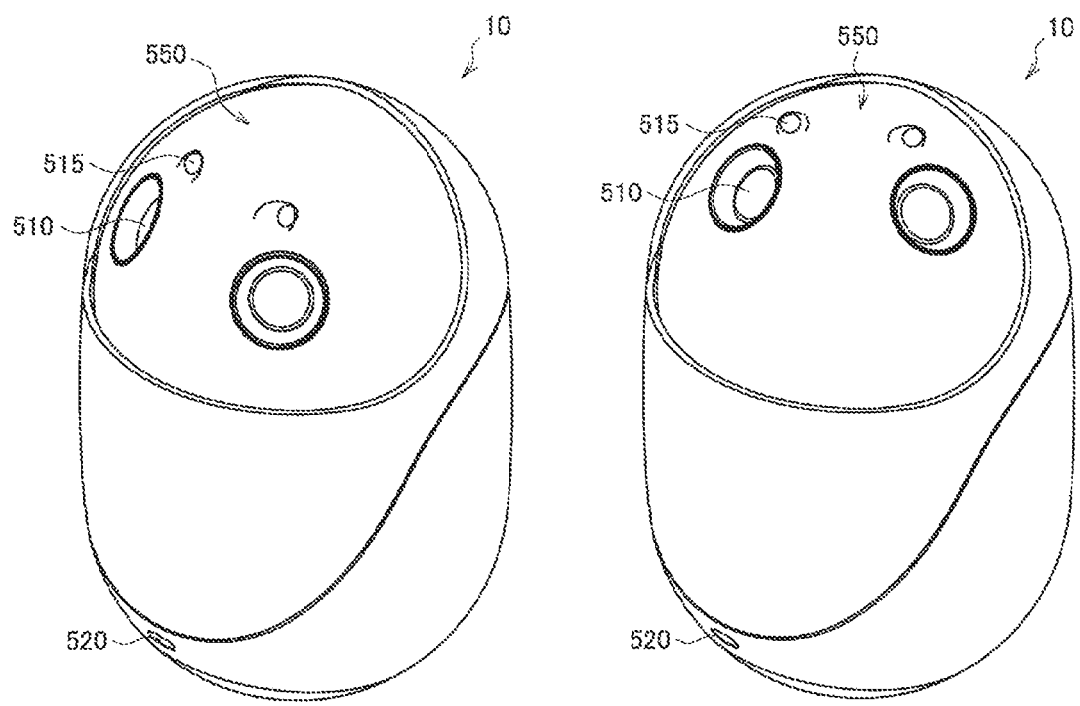
FIG. 20 is a perspective view of the autonomous operation unit according to the embodiment.
Figure 21:
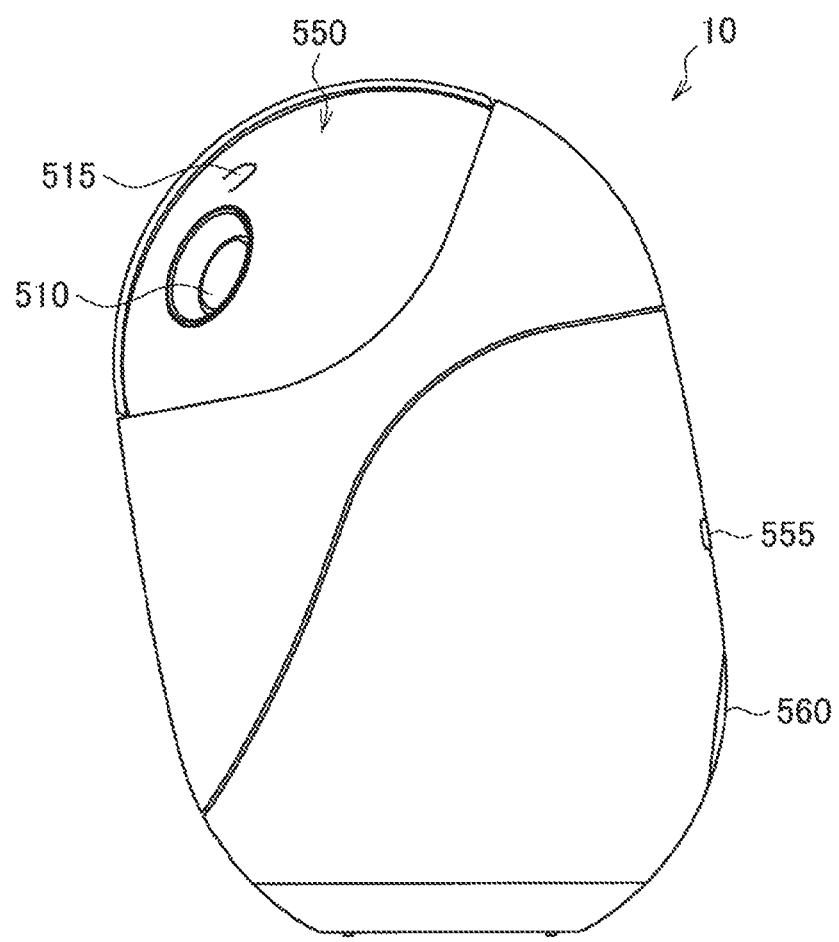
FIG. 21 is a side view of the autonomous operation unit according to the embodiment.
Figure 22:
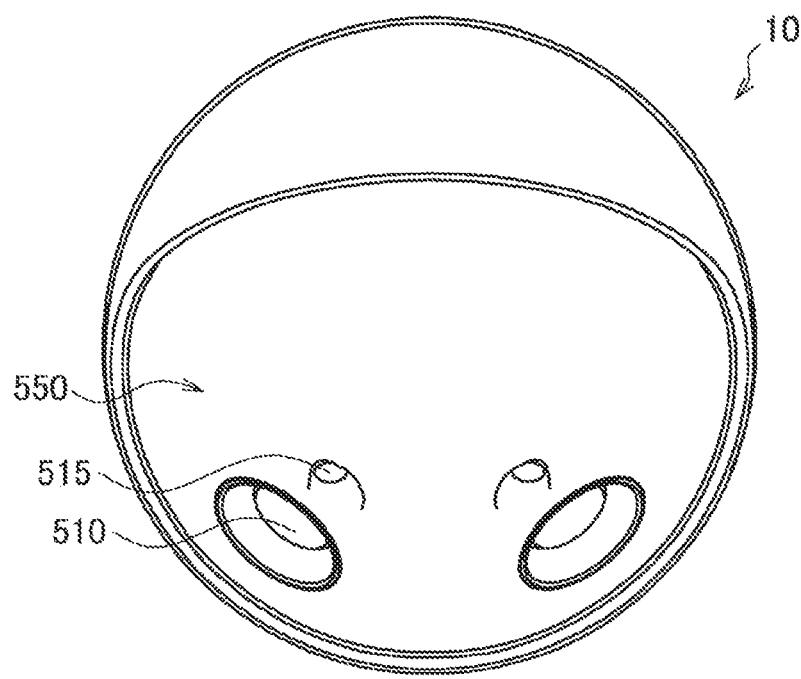
FIG. 22 is a top view of the autonomous operation unit according to the embodiment.
Figure 23:
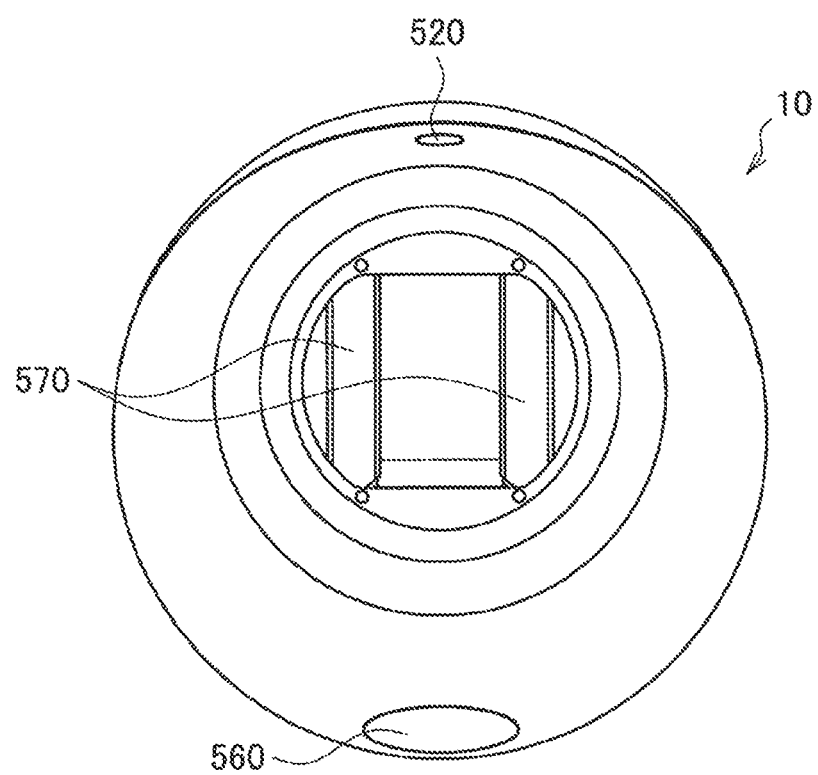
FIG. 23 is a bottom view of the autonomous operation unit according to the embodiment.

Next, a hardware configuration example of the autonomous operation unit 10 according to the present embodiment will be explained. First, referring to FIG. 19 to FIG. 23, an example of an exterior of the autonomous operation unit 10 according to the present embodiment will be described. FIG. 19 is a front view and a rear view of the autonomous operation unit 10 according to the present embodiment. Moreover, FIG. 20 is a perspective view of the autonomous operation unit 10 according to the present embodiment. Furthermore, FIG. 21 is a side view of the autonomous operation unit 10 according to the present embodiment. Moreover, FIG. 22 and FIG. 23 are a top view and a bottom view of the autonomous operation unit 10 according to the present embodiment.

As illustrated in FIG. 19 to FIG. 22, the autonomous operation unit 10 according to the present embodiment includes two eye parts 510 corresponding to a right eye and a left eye at an upper portion of a main unit. The eye part 510 is implemented by, for example, the RGB_LED 182 or the white LED 184 described above, or the like, and can express an eye direction, a blink, and the like. The eye part 510 is not limited to the example described above, but may be implemented by a single or two independent organic light emitting diodes (OLEDs) or the like also.

Moreover, the autonomous operation unit 10 according to the present embodiment has two units of cameras 515 above the eye parts 510. The camera 515 has a function of imaging a user or a surrounding environment. Moreover, the autonomous operation unit 10 can implement simultaneous localization and mapping (SLAM) based on images captured by the cameras 515.

The eye parts 510 and the cameras 515 according to the present embodiment are arranged on a substrate 505 arranged inside a surface of an exterior. Furthermore, the surface of the exterior of the autonomous operation unit 10 according to the present embodiment is formed with a non-transparent material, but at portions corresponding to the substrates on which the eye parts and a cameras 151 are arranged, a head cover 550 using a transparent or translucent material is provided. Thus, the user can recognize the eye parts 510 of the autonomous operation unit 10, and the autonomous operation unit 10 can image an outside world.

Moreover, as illustrated in FIG. 19, FIG. 20, and FIG. 23, the autonomous operation unit 10 according to the present embodiment includes a ToF sensor 520 at a lower front portion. The ToF sensor 520 has a function of detecting a distance to an object present in a frontward direction. According to the ToF sensor 520, distances to various kinds of objects can be highly accurately detected, and by detecting a step or the like, a fall or a tumble can be prevented.

Furthermore, as illustrated in FIG. 19, FIG. 21, the autonomous operation unit 10 according to the present embodiment may have a connecting terminal 555 for an external device and a power switch 560 on a rear surface. The autonomous operation unit 10 can perform data communication by connecting to an external device through the connecting terminal 555.

Moreover, as illustrated in FIG. 23, the autonomous operation unit 10 according to the present embodiment includes two wheels 570 on a bottom surface. The wheels 570 according to the present embodiment are driven by different motors 565, respectively. Thus, the autonomous operation unit 10 can perform moving actions, such as moving forward, moving backward, turning, and rotating. Furthermore, the wheels 570 according to the present embodiment are arranged so as to be retractable to the inside, and to be ejectable to the outside. The autonomous operation unit 10 according to the present embodiment can also make a jump action by ejecting the two wheels 570 to the outside vigorously. FIG. 23 illustrates a state in which the wheels 570 are stored inside the main unit.

Figure 24:
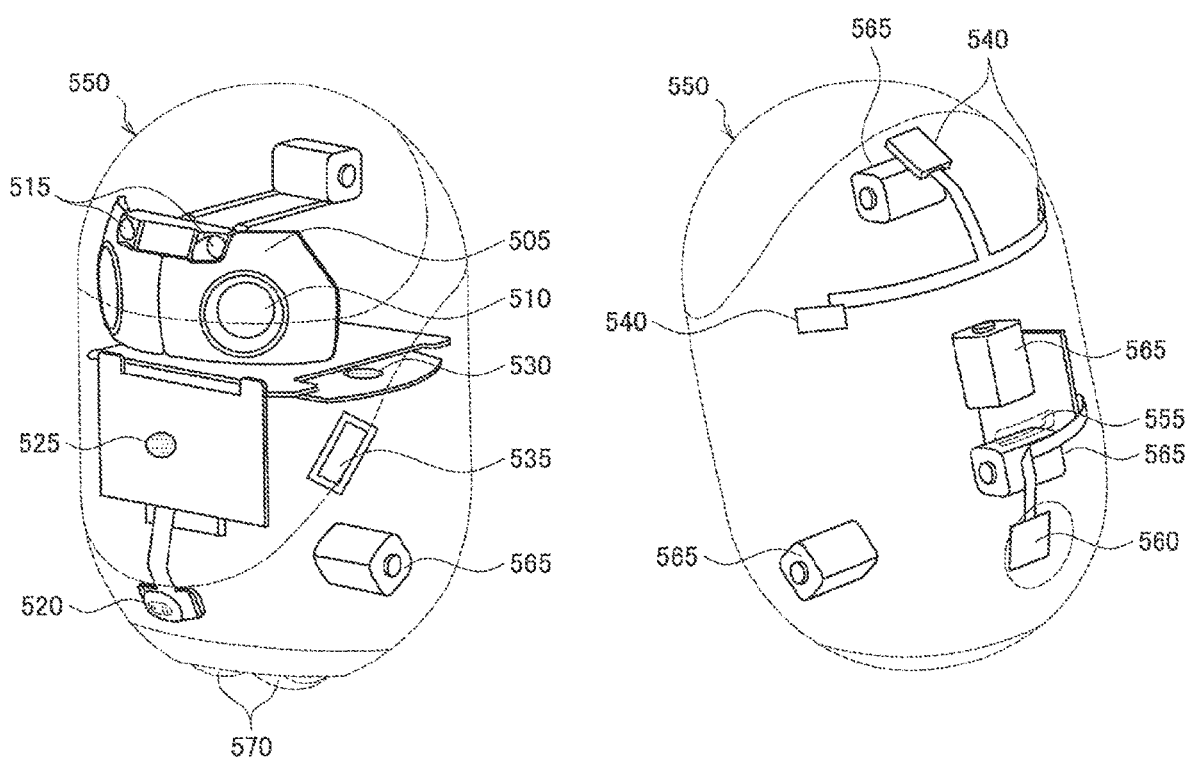
FIG. 24 is a schematic diagram for explaining an inner structure of the autonomous operation unit according to the embodiment.

As above, the exterior of the autonomous operation unit 10 according to the present embodiment has been explained. Subsequently, an inner structure of the autonomous operation unit 10 according to the present embodiment will be explained. FIG. 24 is a schematic diagram for explaining an inner structure of the autonomous operation unit 10 according to the present embodiment.

As illustrated on a left side of FIG. 24, the autonomous operation unit 10 according to the present embodiment includes a inertial sensor 525 and a communication device 530 arranged on an electronic substrate. The inertial sensor 525 detects an acceleration and an angular velocity of the autonomous operation unit 10. Moreover, the communication device 530 is a component to implement wireless communication with outside, and includes, for example, Bluetooth (registered trademark), Wi-Fi (registered trademark) antenna, and the like.

Furthermore, the autonomous operation unit 10 includes a speaker 535, for example, inside of a side surface of the main unit. The autonomous operation unit 10 can output various sound information including a voice by the speaker 535.

Moreover, as illustrated on a right side of FIG. 24, the autonomous operation unit 10 according to the present embodiment includes plural microphones 540 inside of an upper portion of the main unit. The microphones 540 collects a speech of a user, and an environmental noise of surroundings. Furthermore, being equipped with the plural microphones 540, the autonomous operation unit 10 can collect a sound generated in the surroundings with high sensitivity, and can perform localization of a sound source.

Moreover, the autonomous operation unit 10 includes plural motors 565 as illustrated in FIG. 24. The autonomous operation unit 10 may include, for example, two units of the motors 565 to drive the substrate on which the eye parts 510 and the cameras 515 are arranged in a vertical direction, two units of the motors 565 to drive the left and right wheels 570, and one unit of the motor 565 to enable a forward leaning position of the autonomous operation unit 10. The autonomous operation unit 10 according to the present embodiment can express rich movements by the plural motors 565 described above.

Figure 25:
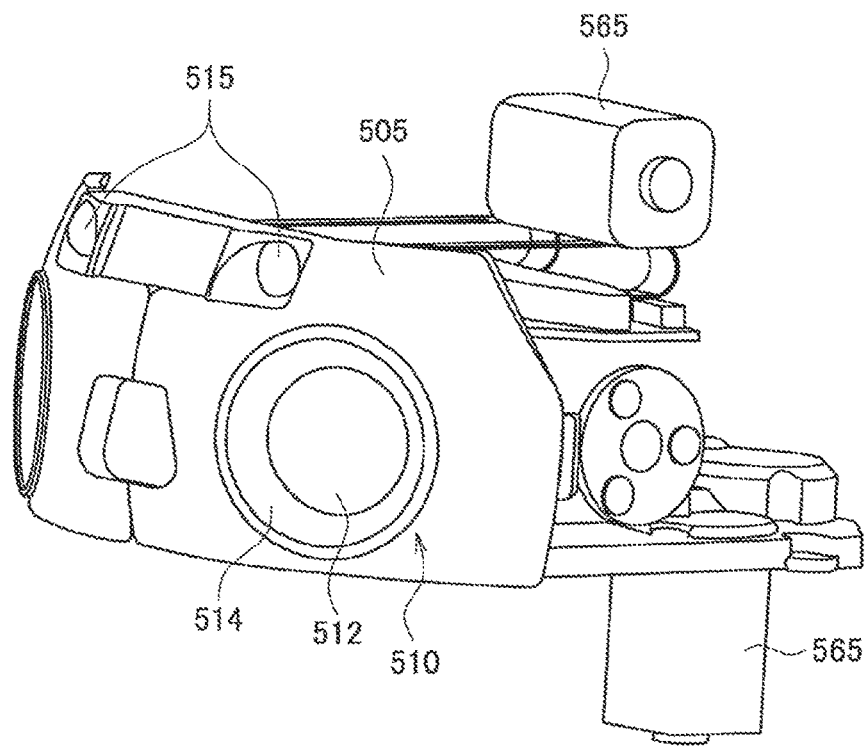
FIG. 25 is a diagram illustrating a configuration of a substrate according to the embodiment.
Figure 26:
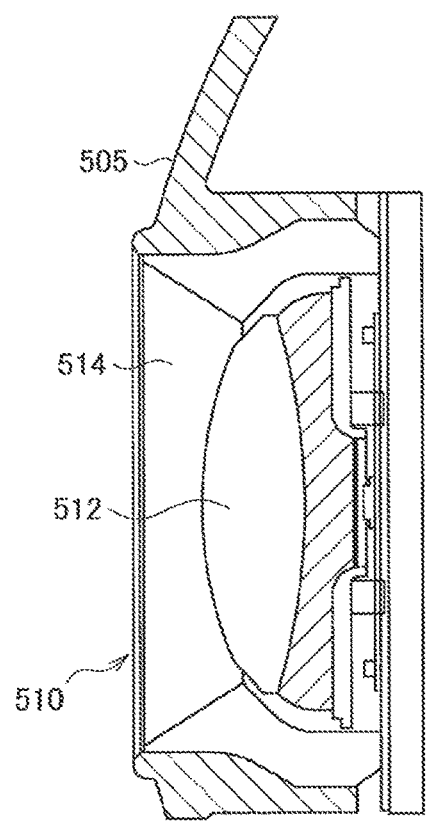
FIG. 26 is a partial cross-section of the substrate according to the embodiment.

Next, a configuration of the substrate 505 on which the eye parts 510 and the cameras 515 according to the present embodiment are arranged, and a configuration of the eye part 510 will be explained in detail. FIG. 25 is a diagram illustrating a configuration of the substrate 505 according to the present embodiment. Moreover, FIG. 26 is a partial cross-section of the substrate 505 according to the present embodiment. Referring to FIG. 25, the substrate 505 according to the present embodiment is connected to the two motors 565. As described above, the two motors 565 can drive the substrate 505 on which the eye parts 510 and the cameras 515 are arranged in a vertical direction and a horizontal direction. By this arrangement, the eye parts 510 of the autonomous operation unit 10 can be flexibly moved in the vertical direction and the horizontal direction, and it becomes possible to express rich eye movements according to a situation and an action.

Furthermore, as illustrated in FIG. 25 and FIG. 26, the eye part 510 is constituted of a central portion 512 corresponding to an iris, and a peripheral portion 514 corresponding to a white of the eye. The central portion 512 may include the RGB_LED 182 described above, and the peripheral portion 514 may include the white LED 184. As described, the autonomous operation unit 10 according to the present embodiment separates components of the eye part 510 into two portions, and thereby enabled to express natural eye expression resembling to an actual living thing.

Figure 27:
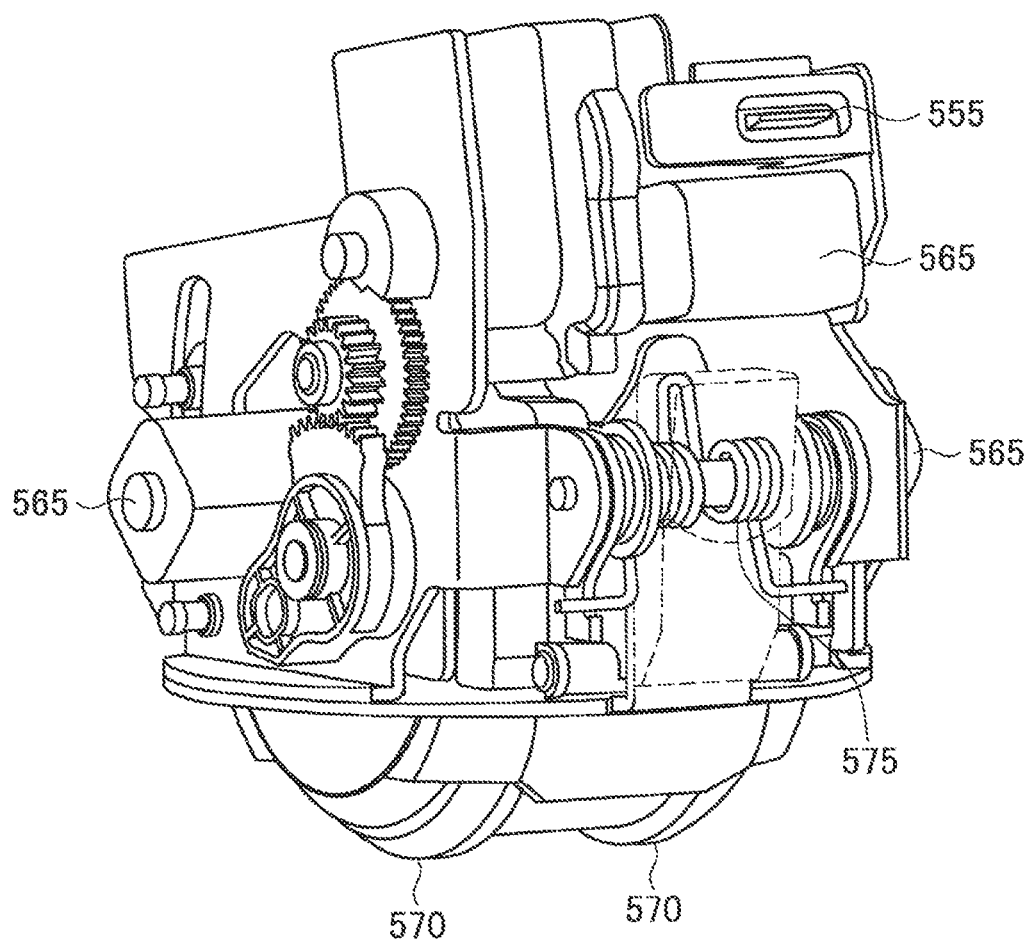
FIG. 27 is a diagram illustrating a peripheral structure of a wheel according to the embodiment.
Figure 28:
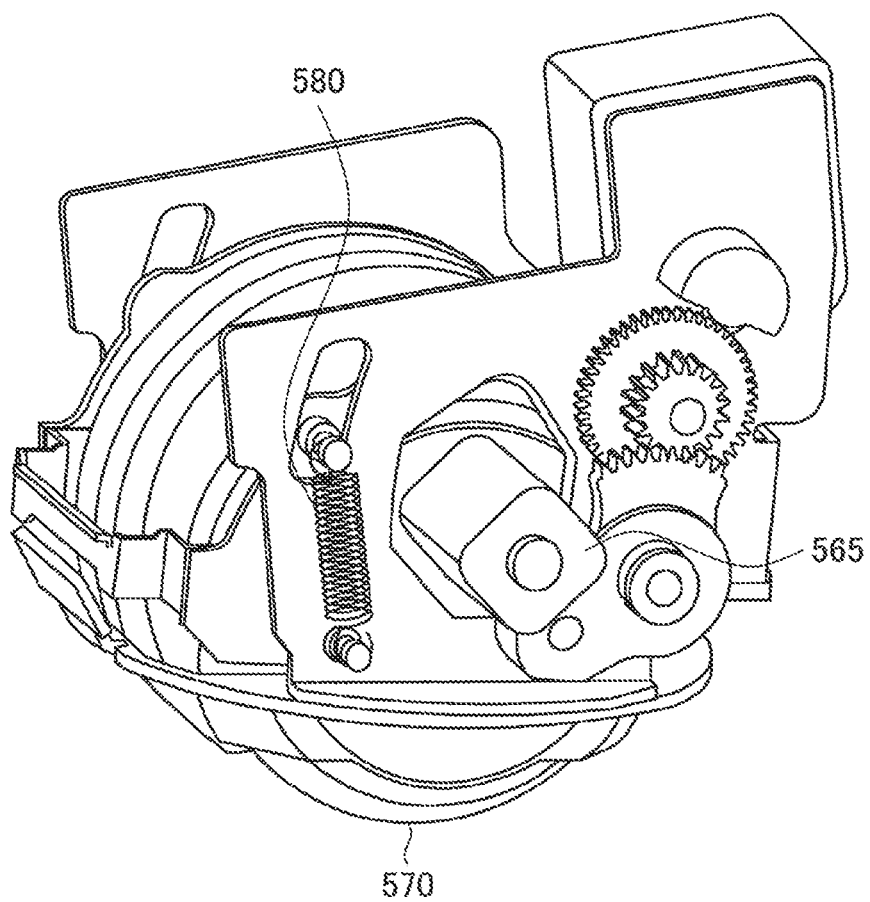
FIG. 28 is a diagram illustrating a peripheral structure of a wheel according to the embodiment.

Next, referring to FIG. 27 and FIG. 28, a structure of the wheel 570 according to the present embodiment will be explained in detail. FIG. 27 and FIG. 28 are diagrams illustrating a peripheral structure of the wheel 570 according to the present embodiment. The two wheels 570 according to the present embodiment are driven by the respective independent motors 565. With this configuration, moving actions, such as turning and rotating at the same position, in addition to simple moving forward and backward, can be precisely expressed Moreover, as described above, the wheel 570 according to the present embodiment is provided so as to be retractable to the inside of the main unit and ejectable to the outside. Moreover, by arranging a dumper 575 coaxially to the wheel according to the present embodiment, transmission of impacts and vibrations to a shaft and the main unit can be effectively reduced.

Furthermore, as illustrated in FIG. 28, an auxiliary spring 580 may be arranged in the wheel 570 according to the present embodiment. Driving of the wheel according to the present embodiment requires highest torque among driven parts included in the autonomous operation unit 10, but by providing the auxiliary spring 580, all of the motors 565 can be communized without using the different motors for the respective driven parts.

2. CONCLUSION

As explained above, the control unit 150 according to one embodiment of the present disclosure controls transition among plural states relating to speech recognition processing through an autonomous operation unit based on a detected trigger. The plural states described above includes the first active state in which an action of the autonomous operation unit is restricted, and the second active state in which the speech recognition processing is performed. According to such a configuration, the speech recognition accuracy can be improved, and a natural conversation can be made.

As above, exemplary embodiments of the present disclosure have been explained in detail, referring to the accompanying drawings, but the technical scope of the present disclosure is not limited to the examples. It is obvious that those who have common knowledge in a technical field of the present disclosure can think of various alteration examples and correction examples within a scope of the technical idea described in claims, and these are also understood to naturally belong to the technical scope of the present disclosure.

Moreover, the effects described in the present application are only an explanatory or exemplary, and are not limited. That is, the technique according to the present disclosure can produce other effects obvious to those skilled in the art from the description of the present application, in addition to the effects described above or in place of the effects described above.

Moreover, also a program to cause hardware, such as a CPU, a ROM, and a RAM, equipped in a computer to exert functions equivalent to the functions of the control unit 150 can be created, and a computer-readable non-transient recording medium in which the program is recorded can also be provided.

Furthermore, respective steps according to the processing performed by the autonomous operation unit 10 in the present application is not necessarily required to be performed chronologically in the order described in the flowcharts. For example, the respective steps according to the processing performed by the autonomous operation unit 10 may be processed in order different from the order described in the flowcharts, or may be performed in parallel.

Following configurations also belong to the technical scope of the present disclosure.

(1)

An information processing apparatus comprising
a control unit that controls an action of an autonomous operation unit, wherein
the control unit controls transition of a plurality of states relating to speech recognition processing through the autonomous operation unit based on a detected trigger, and
the states include a first active state in which an action of the autonomous operation unit is restricted, and a second active state in which the speech recognition processing is performed.

(2)

The information processing apparatus according to (1), wherein
the states further include a normal state in which an action of the autonomous operation unit is not restricted.

(3)

The information processing apparatus according to (2), wherein
the control unit controls the action of the autonomous operation unit such that a volume of an operating noise is lower than a threshold in the first active state.

(4)

The information processing apparatus according to (3), wherein
the control unit causes the autonomous operation unit to transmit a speech sound collected by the autonomous operation unit to a speech recognition apparatus in the second active state.

(5)

The information processing apparatus according to (4), wherein
the control unit causes the autonomous operation unit to accumulate the speech sound in the first active state.

(6)

The information processing apparatus according to (5), wherein
the control unit controls to transmit the speech sound accumulated in the first active state to the speech recognition apparatus with transition to the second active state.

(7)

The information processing apparatus according to (6), wherein
the control unit causes the autonomous operation unit to transition to the second active state when a postfix trigger indicating an intention of a posterior inquiry with respect to the autonomous operation unit is detected after a speech of a user has started in the first active state, and to transmit at least the speech sound accumulated before detection of the postfix trigger to the speech recognition apparatus.

(8)

The information processing apparatus according to (7), wherein
the postfix trigger includes at least either one of detection of a specific word, detection of a specific gesture, detection of a touch to the autonomous operation unit, detection of a face of a user, detection of a sudden sound, and detection of a moving body.

(9)

The information processing apparatus according to any one of (4) to (8), wherein
the control unit causes the autonomous operation unit to make an active speech and behavior to a user in the first active state, and causes the autonomous operation unit to transition to the second active state when the user reacts to the speech and behavior.

(10)

The information processing apparatus according to any one of (4) to (9), wherein
the control unit causes the autonomous operation unit to transition to the second active state when a prefix trigger indicating an intention of anterior inquiry with respect to the autonomous operation unit is detected before start of a speech of a user in the first active state, and to transmit the speech sound collected after detection of the prefix trigger to the speech recognition apparatus.

(11)

The information processing apparatus according to any one of (2) to (10), wherein the control unit causes the autonomous operation unit to transition to the first active state when an environmental trigger indicating that a possibility of a user making a speech with respect to the autonomous operation unit has become high in the normal state.

(12)

The information processing apparatus according to (11), wherein the environmental trigger includes at least either one of detection of a touch to the autonomous operation unit, detection of a change of illumination, detection of a moving body, and detection of a sudden sound.

(13)

The information processing apparatus according to any one of (2) to (12), wherein the control unit causes the autonomous operation unit to transition to the normal state when an end environmental trigger indicating that a possibility of a user making a speech with respect to the autonomous operation unit has become low is detected in the first active state.

(14)

The information processing apparatus according to (13), wherein the end environmental trigger includes at least either one of detection of an end of touch to the autonomous operation unit, detection of decrease of illumination, and detection of decrease of an environmental sound.

(15)

The information processing apparatus according to any one of (2) to (14), wherein the control unit causes the autonomous operation unit to transition to any one of the first active state and the normal state when a conversation end trigger related to an end of a conversation is detected in the second active state.

(16)

The information processing apparatus according to (15), wherein the conversation end trigger includes at least either one of detection of a specific word, detection of a specific gesture, detection of a touch to the autonomous operation unit, end of detection of a face of user, and detection of a sudden sound.

(17)

The information processing apparatus according to any one of (2) to (16), wherein the control unit causes the autonomous operation unit to make different expressions respective in the normal state, the first active state, and the second active state.

(18)

The information processing apparatus according to any one of (1) to (17), being an autonomous operation unit.

(19)

An information processing method comprising:

controlling an action of an autonomous operation unit, wherein the controlling includes controlling transition of a plurality of states relating to speech recognition processing through the autonomous operation unit based on a detected trigger, and the states include a first active state in which an action of the autonomous operation unit is restricted, and a second active state in which the speech recognition processing is performed.

(20)

A program that causes a computer to function as an information processing apparatus including:

a control unit that controls an action of an autonomous operation unit, wherein the control unit controls transition of a plurality of states relating to speech recognition processing through the autonomous operation unit based on a detected trigger, and the states include a first active state in which an action of the autonomous operation unit is restricted, and a second active state in which the speech recognition processing is performed.

REFERENCE SIGNS LIST

10 AUTONOMOUS OPERATION UNIT
110 SOUND INPUT UNIT
120 IMAGING UNIT
130 SENSOR UNIT
140 TRIGGER DETECTING UNIT
150 CONTROL UNIT
160 DRIVING UNIT
170 SOUND OUTPUT UNIT
180 DISPLAY UNIT
INFORMATION PROCESSING SERVER
210 SPEECH RECOGNIZING UNIT
220 NATURAL-LANGUAGE PROCESSING UNIT
230 RESPONSE GENERATING UNIT

The invention claimed is:

1. An information processing apparatus, comprising:
circuitry configured to:
   control an action of an autonomous operation unit;
   control a transition between a plurality of states related to a speech recognition process through the autonomous operation unit, wherein the plurality of states includes a first active state in which the action of the autonomous operation unit is restricted, and a second active state in which the speech recognition process is performed;
   accumulate speech sound collected by the autonomous operation unit in the first active state;
   control the transition from the first active state to the second active state based on a detection of a trigger; and
   control, in the second active state, transmission of the speech sound accumulated prior to the detection of the trigger to a speech recognition apparatus.

2. The information processing apparatus according to claim 1, wherein the plurality of states further includes a normal state in which the action of the autonomous operation unit is not restricted.

3. The information processing apparatus according to claim 2, wherein the circuitry is further configured to control the action of the autonomous operation unit such that a volume of an operating noise is lower than a threshold in the first active state.

4. The information processing apparatus according to claim 1, wherein the circuitry is further configured to:
   cause the autonomous operation unit to transition to the second active state in a case where a postfix trigger indicating an intention of a posterior inquiry with respect to the autonomous operation unit is detected after a speech of a user has started in the first active state; and
   control the transmission of the speech sound accumulated before detection of the postfix trigger to the speech recognition apparatus.

5. The information processing apparatus according to claim 4, wherein the postfix trigger includes at least one of detection of a specific word, detection of a specific gesture, detection of a touch to the autonomous operation unit, detection of a face of the user, detection of a sudden sound, and detection of a moving body.

6. The information processing apparatus according to claim 1, wherein the circuitry is further configured to:
cause the autonomous operation unit to make an active speech and behavior to a user in the first active state; and
cause the autonomous operation unit to transition to the second active state based on a reaction of the user to the active speech and behavior.

7. The information processing apparatus according to claim 1, wherein the circuitry is further configured to:
cause the autonomous operation unit to transition to the second active state in a case where a prefix trigger indicating an intention of anterior inquiry with respect to the autonomous operation unit is detected before start of a speech of a user in the first active state; and
control transmission of the speech sound collected after detection of the prefix trigger to the speech recognition apparatus.

8. The information processing apparatus according to claim 2, wherein the circuitry is further configured to cause the autonomous operation unit to transition to the first active state in a case where an environmental trigger indicating that a possibility of a user making a speech with respect to the autonomous operation unit has become high in the normal state.

9. The information processing apparatus according to claim 8, wherein the environmental trigger includes at least one of detection of a touch to the autonomous operation unit, detection of a change of illumination, detection of a moving body, and detection of a sudden sound.

10. The information processing apparatus according to claim 2, wherein the circuitry is further configured to cause the autonomous operation unit to transition to the normal state in a case where an end environmental trigger indicating that a possibility of a user making a speech with respect to the autonomous operation unit has become low is detected in the first active state.

11. The information processing apparatus according to claim 10, wherein the end environmental trigger includes at least one of detection of an end of touch to the autonomous operation unit, detection of decrease of illumination, and detection of decrease of an environmental sound.

12. The information processing apparatus according to claim 2, wherein the circuitry is further configured to cause the autonomous operation unit to transition to one of the first active state or the normal state in a case where a conversation end trigger related to an end of a conversation is detected in the second active state.

13. The information processing apparatus according to claim 12, wherein the conversation end trigger includes at least one of detection of a specific word, detection of a specific gesture, detection of a touch to the autonomous operation unit, end of detection of a face of a user, and detection of a sudden sound.

14. The information processing apparatus according to claim 2, wherein the circuitry is further configured to cause the autonomous operation unit to make different expressions in the normal state, the first active state, and the second active state.

15. The information processing apparatus according to claim 1, wherein the information processing apparatus includes the autonomous operation unit.

16. An information processing method, comprising:
controlling an action of an autonomous operation unit;
controlling a transition between a plurality of states related to a speech recognition process through the autonomous operation unit based on a detected trigger, wherein the plurality of states includes a first active state in which the action of the autonomous operation unit is restricted, and a second active state in which the speech recognition process is performed;
accumulating speech sound collected by the autonomous operation unit in the first active state;
controlling the transition from the first active state to the second active state based on a detection of a trigger; and
controlling, in the second active state, transmission of the speech sound accumulated prior to the detection of the trigger to a speech recognition apparatus.

17. A non-transitory computer-readable medium having stored thereon, computer-executable instructions which, when executed by a processor of an information processing apparatus, cause the processor to execute operations, the operations comprising:
controlling an action of an autonomous operation unit;
controlling a transition between a plurality of states related to a speech recognition process through the autonomous operation unit, wherein the plurality of states includes a first active state in which the action of the autonomous operation unit is restricted; and a second active state in which the speech recognition process is performed;
accumulating speech sound collected by the autonomous operation unit in the first active state;
controlling the transition from the first active state to the second active state based on a detection of a trigger; and
controlling, in the second active state, transmission of the speech sound accumulated prior to the detection of the trigger to a speech recognition apparatus.

18. An information processing apparatus, comprising:
circuitry configured to:
control an action of an autonomous operation unit;
control transition between a plurality of states related to a speech recognition process through the autonomous operation unit, wherein the plurality of states includes a first active state in which the action of the autonomous operation unit is restricted, a second active state in which the speech recognition process is performed, and a normal state in which the action of the autonomous operation unit is not restricted; and
cause the autonomous operation unit to transition to one of the first active state or the normal state in a case where a conversation end trigger related to an end of a conversation is detected in the second active state.

* * * * *